(12) United States Patent
Sato

(10) Patent No.: US 9,176,692 B2
(45) Date of Patent: Nov. 3, 2015

(54) JOB HISTORY MANAGEMENT SYSTEM AND CONTROL METHOD THEREOF

(71) Applicant: CANON KABUSHIKI KAISHA, Tokyo (JP)

(72) Inventor: Junji Sato, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 13/957,265

(22) Filed: Aug. 1, 2013

(65) Prior Publication Data

US 2014/0036311 A1 Feb. 6, 2014

(30) Foreign Application Priority Data

Aug. 6, 2012 (JP) ................................. 2012-173963

(51) Int. Cl.
*G06F 3/12* (2006.01)
*H04N 1/60* (2006.01)

(52) U.S. Cl.
CPC ............ *G06F 3/1273* (2013.01); *G06F 3/1211* (2013.01); *G06F 3/1285* (2013.01); *G06F 3/1207* (2013.01); *G06F 3/1291* (2013.01)

(58) Field of Classification Search
CPC ..... G06F 3/1285; G06F 3/1207; G06F 3/1291
USPC ............ 358/1.1, 1.4, 1.5, 1.6, 1.9, 1.11, 1.12, 358/1.13, 1.14, 1.15, 1.16, 1.17, 1.18
See application file for complete search history.

(56) References Cited

U.S. PATENT DOCUMENTS

2006/0133829 A1* 6/2006 Kato .................................. 399/8
2006/0232594 A1 10/2006 Kanematsu
2009/0046314 A1 2/2009 Shigeeda

FOREIGN PATENT DOCUMENTS

CN 101621600 A 1/2010
JP 2006-295258 A 10/2006

* cited by examiner

*Primary Examiner* — Thierry L Pham
(74) *Attorney, Agent, or Firm* — Canon USA, Inc., IP Division

(57) ABSTRACT

In a job history management system, a printer determines whether the print data includes a job history recorded flag indicating that a PC has recorded a job history of the print data and has transmitted the job history to a job history management server. If the printer determines that the job history recorded flag is not included in the print data, the printer transmits the print data to a multifunction peripheral. Upon receiving the print data from the printer, the multifunction peripheral records the job history of the print data and transmits the job history to the job history management server, without performing a printing process based on the received print data.

7 Claims, 22 Drawing Sheets

FIG.6

| | | |
|---|---|---|
| | JOB HISTORY ID | 00003 |
| | JOB TYPE | PRINT |
| | JOB EXECUTION USER | User001 |
| ATTRIBUTE INFORMATION | JOB STARTING TIME | 2007/9/30 17:13 |
| | JOB EXECUTION DEVICE | PRINTER 102 |
| | NUMBER OF SHEETS TO BE PRINTED | 4 |
| | JOB EXECUTION RESULT | SUCCESSFUL |
| | . . . . | . . . . |
| CONTENT INFORMATION | IMAGE DATA | . . . . |
| | TEXT DATA | . . . . |

| ATTRIBUTE INFORMATION | JOB HISTORY ID | 00003 |
| --- | --- | --- |
| | JOB TYPE | PRINT |
| | JOB EXECUTION USER | User001 |
| | JOB STARTING TIME | 2007/9/30 17:13 — 803 |
| | JOB EXECUTION DEVICE | PRINTER 102 |
| | NUMBER OF SHEETS TO BE PRINTED | 4 |
| | JOB EXECUTION RESULT | — 802 |
| | . . . . | . . . . |

| | | JOB HISTORY ID | 00003 |
| --- | --- | --- | --- |
| 812 | ATTRIBUTE INFORMATION | JOB TYPE | PRINT |
| | | JOB EXECUTION USER | User001 |
| | | JOB STARTING TIME | 2007/9/30 17:13 — 815 |
| | | JOB EXECUTION DEVICE | PRINTER 102 |
| | | NUMBER OF SHEETS TO BE PRINTED | 4 |
| | | JOB EXECUTION RESULT | — 814 |
| | | . . . . | . . . . |
| 813 | CONTENT INFORMATION | IMAGE DATA | . . . . |
| | | TEXT DATA | . . . . |

| DEVICE ID | D001 |
|---|---|
| MODEL NAME | PRINTER ABC |
| JOB HISTORY RECORDING REQUEST TRANSMISSION DESTINATION | MULTIFUNCTION PERIPHERAL 103 |
| ADMINISTRATOR NAME | sato |
| ADMINISTRATOR E-MAIL ADDRESS | sato@xxxxxxxx.xxx |
| . . . . | . . . . |

| | | |
|---|---|---|
| ATTRIBUTE INFORMATION | JOB HISTORY ID | 00003 |
| | JOB TYPE | PRINT |
| | JOB EXECUTION USER | User001 |
| | JOB STARTING TIME | 2007/9/30 17:15 |
| | JOB EXECUTION DEVICE | PRINTER 102 |
| | NUMBER OF SHEETS TO BE PRINTED | 4 |
| | JOB EXECUTION RESULT | SUCCESSFUL |
| | . . . . | . . . . |
| CONTENT INFORMATION | IMAGE DATA | . . . . |
| | TEXT DATA | . . . . |

1702 (points to JOB STARTING TIME row)

FIG.21

| | | | |
|---|---|---|---|
| ATTRIBUTE INFORMATION | JOB HISTORY ID | 00003 | |
| | JOB TYPE | BOX STORING JOB | 2102 |
| | JOB EXECUTION USER | User001 | |
| | JOB STARTING TIME | 2007/9/30 17:15 | |
| | JOB EXECUTION DEVICE | PRINTER 102 | |
| | NUMBER OF SHEETS TO BE PRINTED | 4 | |
| | JOB EXECUTION RESULT | SUCCESSFUL | |
| | . . . . | . . . . | |
| CONTENT INFORMATION | IMAGE DATA | . . . . | |
| | TEXT DATA | . . . . | |

2101

JOB HISTORY MANAGEMENT SYSTEM AND CONTROL METHOD THEREOF

BACKGROUND OF THE INVENTION

1. Field of the Invention

The present invention relates to a technique for managing as a job history, information on a job executed by an image forming apparatus.

2. Description of the Related Art

Conventionally, a job history management system records the job history each time a printer or a scanner executes a job, or an image forming apparatus such as a digital multifunction apparatus executes a copy job, facsimile transmission and reception job, or a print job. The job history management system then stores the job history in a database. For example, if the job history is to be recorded in the image forming apparatus, information such as a name of a user who has instructed print processing to be performed, time of print processing, and images and text in a document which has been copied are recorded as the job history. The job history is then transmitted to and managed in a server. By using the job history management system, the user can search the job history managed in the server and refer to the content of the job which has been performed in the past.

However, depending on a performance of the image forming apparatus, time may become necessary for the image forming apparatus to execute the job after the user issues a print instruction due to a load of processing in recording of the job history. Further, it may be difficult for the image forming apparatus to temporarily store the job history until transmitting the recorded job history to the server.

On the other hand, there is a method for recording the job history employing a printer driver. However, if the user uses a printer driver which does not include a job history recording function and instructs the image forming apparatus to perform print processing, unrecorded job history may occur.

To solve such a problem, Japanese Patent Application Laid-Open No. 2006-295258 discusses a technique in which the image forming apparatus determines whether the received print data has already been archived. If the received print data has not been archived, the print data is not allowed to be formed into an image.

However, according to the technique discussed in Japanese Patent Application Laid-Open No. 2006-295258, if both the printer driver and the image forming apparatus performing print processing do not include the job history recording function, the recorded job history cannot be appropriately managed by the server.

SUMMARY OF THE INVENTION

According to an aspect of the present invention, a job history management system including a plurality of image forming apparatuses configured to execute print processing based on print data received from an information processing apparatus, and a job history management server configured to manage as a job history a history of a job processed by the image forming apparatus, in which the plurality of image forming apparatuses includes a first image forming apparatus and a second image forming apparatus. The first image forming apparatus includes a print execution unit configured to execute print processing based on the print data received from the information processing apparatus, a determination unit configured to determine whether the print data received from the information processing apparatus includes identification information indicating that a history of a job to be performed by the image forming apparatus is previously recorded as a job history and transmitted to the job history management server, and a transmission unit configured to, in a case where the determination unit determines that the print data does not include the identification information, transmit the print data to the second image forming apparatus, and the second image forming apparatus includes a receiving unit configured to receive the print data from the information processing apparatus or the first image forming apparatus, and a history recording unit configured to, in a case where the receiving unit receives the print data from the first image forming apparatus, record a history of a job to be performed by the first image forming apparatus as a job history and transmit the job history to the job history management server, without executing print processing based on the received print data.

Further features and aspects of the present invention will become apparent from the following description of exemplary embodiments with reference to the attached drawings.

BRIEF DESCRIPTION OF THE DRAWINGS

FIG. 6 illustrates an example of the job history transmitted from the PC 101 to a data processing server 104.

FIGS. 8A and 8B illustrate examples of attribute information recorded by the printer 102 according to the first exemplary embodiment.

FIG. 11 illustrates an example of setting information stored in the printer 102.

FIG. 17 illustrates an example of the job history transmitted from the digital multifunction peripheral 103 to the data processing server 104 according to the third exemplary embodiment.

FIG. 21 illustrates an example of the job history transmitted from the digital multifunction peripheral 103 to the data processing server 104 according to the fourth exemplary embodiment.

DESCRIPTION OF THE EMBODIMENTS

Various exemplary embodiments, features, and aspects of the invention will be described in detail below with reference to the drawings.

Figure 1:
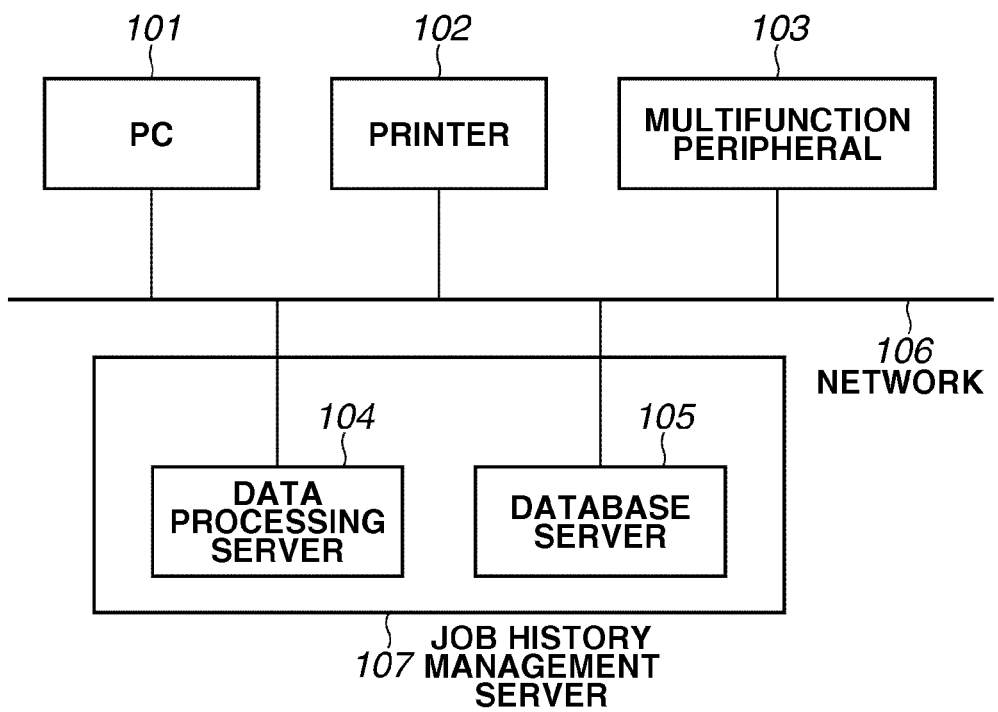
FIG. 1 is a block diagram illustrating a configuration of a job history management system according to an exemplary embodiment of the present invention.

The first exemplary embodiment will be described below. FIG. 1 is a block diagram illustrating the configuration of the history management system according to the present invention. Referring to FIG. 1, the PC 101, the printer 102, the digital multifunction peripheral 103 (hereinafter referred to as the multifunction peripheral 103), the data processing server 104, and a database server 105 are connected to a network 106.

The PC 101 uses the printer driver supporting the printer 102 and the multifunction peripheral 103, and instruct the printer 102 to execute print processing based on the print data. Further, the PC 101 instructs the multifunction peripheral 103 to execute various jobs such as printing and facsimile transmission. The job history management system illustrated in FIG. 1 includes only one PC 101. However, there may be a plurality of PC 101. The PC 101 may include the printer driver which has a job history recording function serving as an additional function. The job history recording function records as a job history, the history of the job processed by the image forming apparatus, and transmits the job history to a job history management server 107. The job history includes the attribute information indicating various types of information associated with the print data, and content information indicating the content of the document in the job. Hereinafter, the PC 101 including the printer driver to which the job history recording function has been added will be referred to as a "job history record supporting PC". Further, the PC 101 including the printer driver to which the job history recording function has not been added will be referred to as a "job history record non-supporting PC". The job history management server 107 will be described below.

The printer 102 is an image forming apparatus (i.e., a first image forming apparatus) which performs printing based on the print data received from the PC 101. Further, the printer 102 transmits the received print data to the multifunction peripheral 103. According to the present exemplary embodiment, there is a plurality of printers 102, including the printer 102 not having the job history recording function, and the printer 102 having the function for recording the attribute information of the job to be executed by the printer 102.

The multifunction peripheral 103 is an image forming apparatus (i.e. a second image forming apparatus) which executes the jobs such as printing, copying, scanning, and facsimile transmission and reception according to a user operation. According to the present exemplary embodiment, the multifunction peripheral 103 includes the job history recording function. More specifically, the multifunction peripheral 103 records as the job history and transmits to the job history management server 107, the history of the job processed by the printer 102. Further, the multifunction peripheral 103 is capable of recording the content information of the received print data, and combining as the job history the attribute information and the content information received from other image forming apparatus. Furthermore, the multifunction peripheral 103 includes an agent function for transmitting to the job history management server 107 the recorded job history.

The job history management server 107 includes the data processing server 104 and the database server 105.

The data processing server 104 receives via the network 106 the job history transmitted from the job history record supporting PC 101 and the multifunction peripheral 103. Upon performing data processing with respect to the received job history, the data processing server 104 transmits the job history to the database server 105. Data processing indicates image resolution conversion, data compression, format conversion, text data extraction using optical character recognition (OCR), and extraction of an image feature amount. Further, the data processing server 104 is capable of combining as the job history the attribute information and the content information received from the multifunction peripheral 103.

The database server 105 is an information processing apparatus which receives from the data processing server 104 and stores in a storing device (not illustrated) therein the job history. The storing device in the database server 105 may be any storing device as long as the job history can be stored, such as a high-capacity storage configured by a hard disk drive (HDD), or a file server.

The network 106 is a communication line for mutually connecting each of the devices, i.e., an in-house local area network (LAN) or a wide area network (WAN) which is widely operated over the Internet.

The job history management system illustrated in FIG. 1 includes each one of each of the elements, i.e., the PC 101, the printer 102, the multifunction peripheral 103, the data processing server 104, and the database server 105. However, the job history management system may include a plurality of each of the elements. Further, each of the functions of the PC 101, the data processing server 104, and the database server 105 may be included in one information processing apparatus. For example, the data processing server 104 and the database server 105 may be included in one information processing apparatus.

Figure 2:
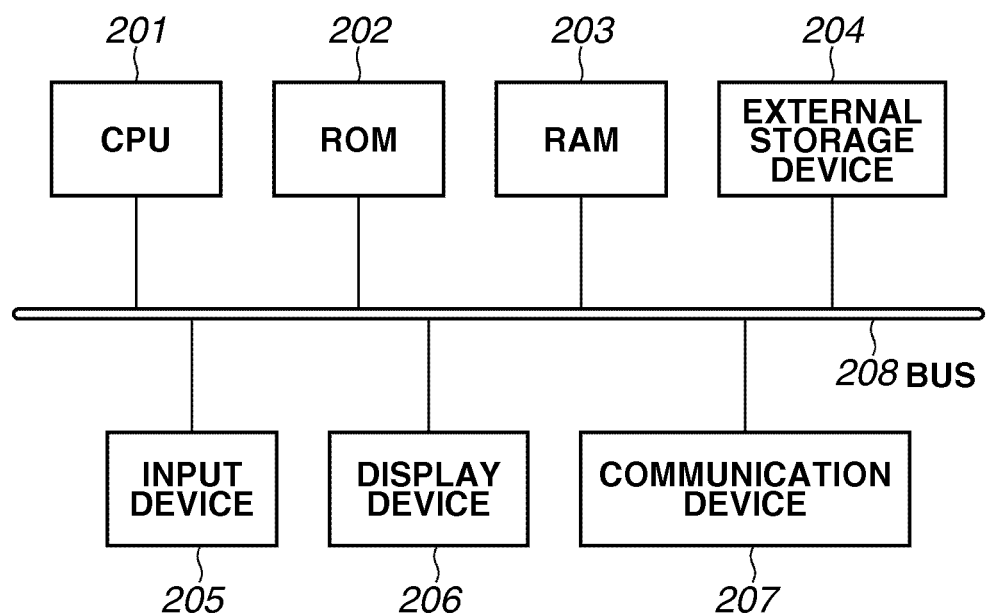
FIG. 2 is a block diagram illustrating a hardware configuration of an information processing apparatus and an image forming apparatus.

FIG. 2 is a block diagram illustrating the hardware configuration of the PC 101 and the printer 102 in the job history management system illustrated in FIG. 1.

Referring to FIG. 2, a central processing unit (CPU) 201 is a processing device which performs arithmetic processing for various data processing regarding obtaining the job history and searching, and controls each of the elements connected to a bus 208.

A read-only memory 202 is a memory exclusively used for reading the data, and stores a basic control program. A random access memory (RAM) 203 is a memory used for reading and writing the data, and is employed by the CPU 201 for performing the various arithmetic processing and temporarily storing the data.

An external storage device 204 stores system programs of an operating system (OS) of the information processing apparatus and the programs in the job history management system, and is used as a temporary storage area of the program of the job history management system and data being processed. The data is input to and output from the external storing device 204 at lower speed as compared to the RAM 203. However, the external storing device 204 is capable of storing large amount of data. The external storage device 204 which is generally configured with a magnetic storage device (i.e., the HDD) may also be a device which reads and records the data by loading an external medium such as a compact disk (CD), a digital versatile disk (DVD), and a memory card.

An input device 205, such as a keyboard and a mouse, is a device for inputting to the information processing apparatus characters and data.

A display device 206, such as a cathode ray tube (CRT) and a liquid crystal monitor, displays a processing result of the information processing apparatus.

A communication device 206 connects to the LAN and performs data communication using transmission control protocol/Internet protocol (TCP/IP), and is used in mutually communicating with other information processing apparatus.

Figure 3A:
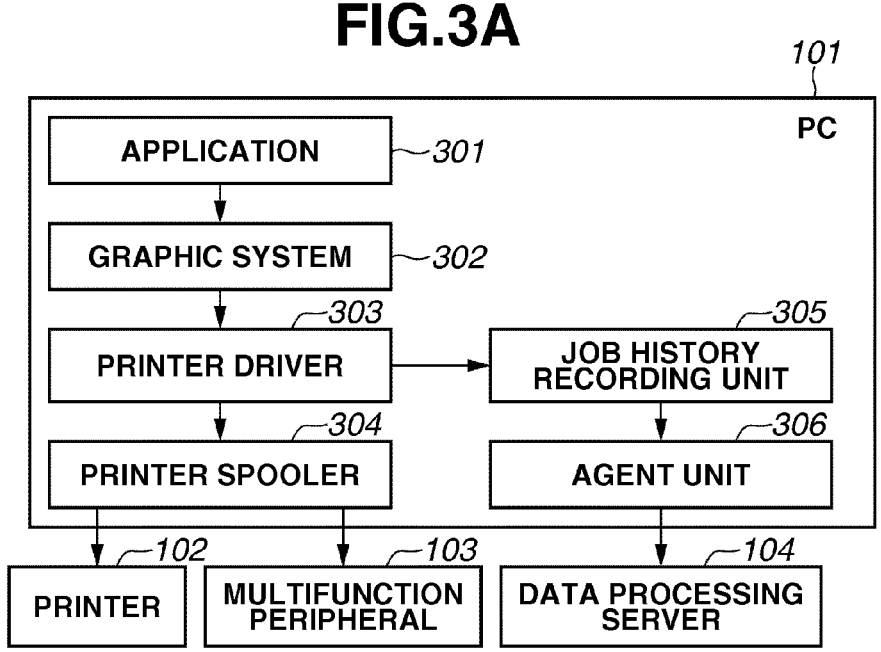
FIGS. 3A, 3B, and 3C illustrate software module configurations of a personal computer (PC) 101, a printer 102, and a digital multifunction peripheral 103.
Figure 3B:
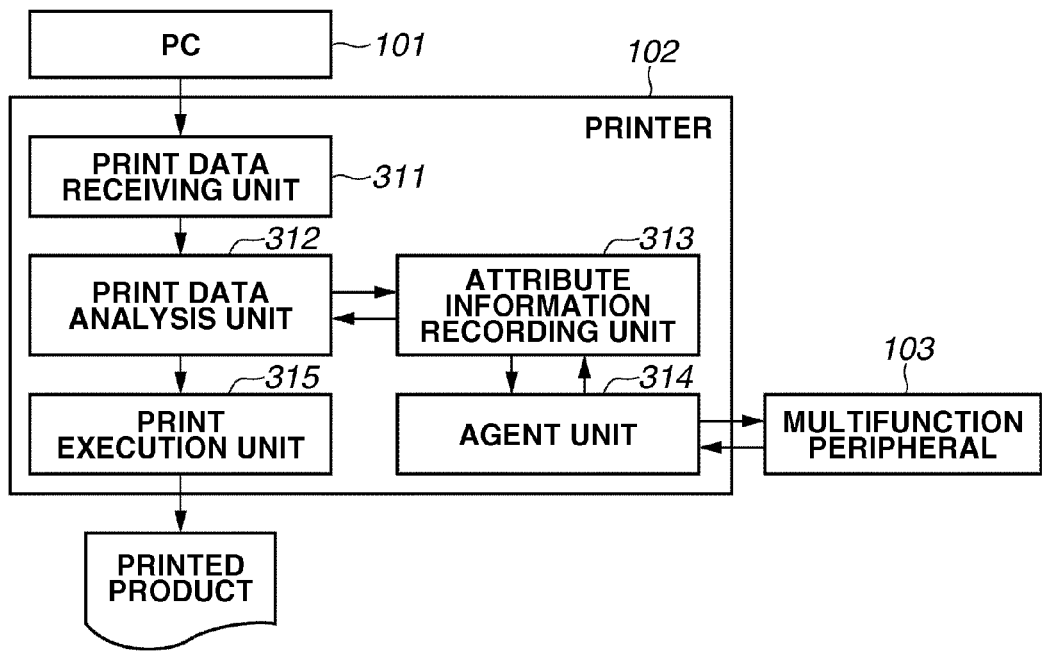
Figure 3C:
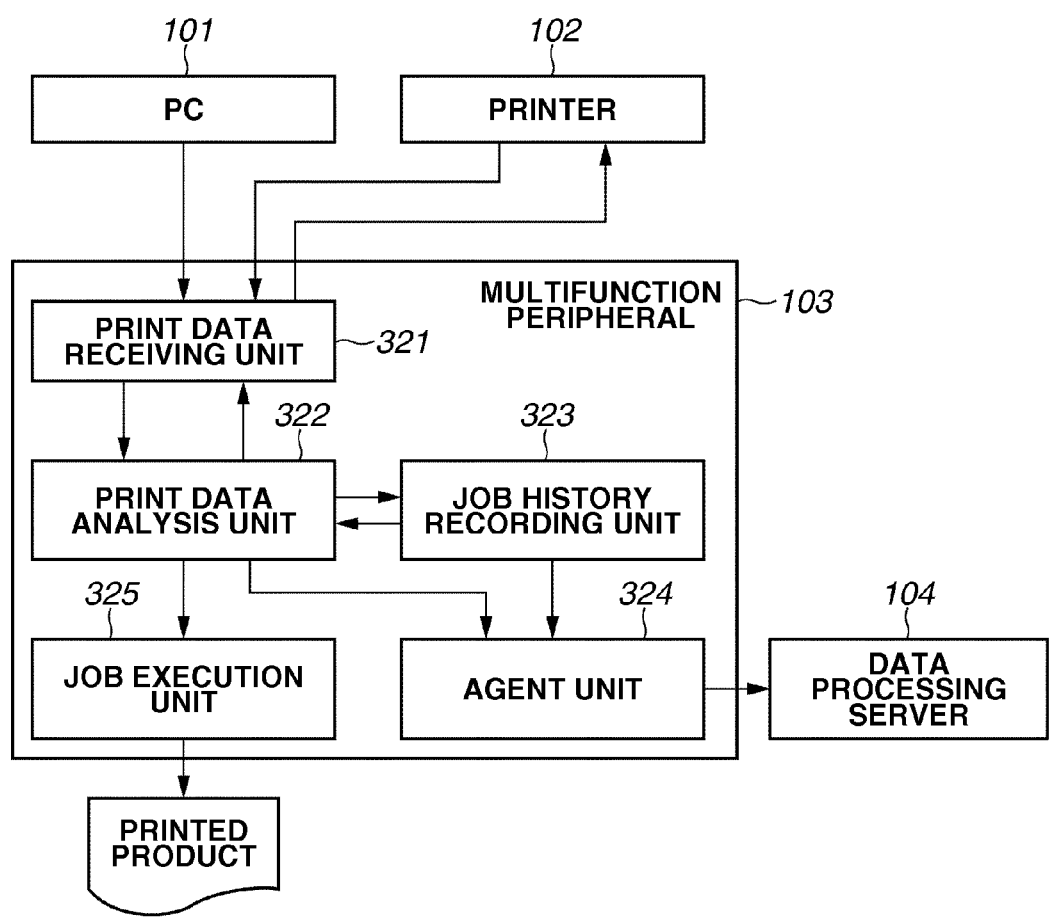

FIG. 3A illustrates the software module configuration of the PC 101. FIGS. 3A, 3B and 3C illustrate print processing performed with respect to the printer 102. However, print processing with respect to the other image forming apparatuses such as the multifunction peripheral 103 is similarly performed.

Referring to FIG. 3A, an application 301 receives a print request from the user, and calls a graphics system 302 provided by the OS. Print processing is thus started.

The graphics engine (not illustrated) provides to the application 301 a common drawing interface which is independent of the image forming apparatus. Further, the graphics system 302 manages the printer drivers corresponding to each of the image forming apparatuses.

A printer driver 303 generates the print data with respect to the printer 102. The printer driver 303 is different for each image forming apparatus. Further, there may be a plurality of printer drivers 303 in the PC. The printer driver 303 illustrated in the examples of FIGS. 3A, 3B, and 3C is the printer driver 303 corresponding to the printer 102.

A printer spooler 304 (hereinafter referred to as a spooler 304) accumulates and transmits to the printer 102 via the network 106 the print data generated by the printer driver 303.

A job history recording unit 305 is software provided as an additional function of the printer driver 303, and records the job history when the print data is generated. Further, the job history recording unit 305 has a function for generating and including in the print data a job history recorded flag 512 (hereinafter referred to as a recorded flag 512), i.e., identification information indicating that the job has been previously recorded. The recorded flag 512 will be described below.

An agent unit 306 accumulates and transmits to the data processing server 104 at predetermined timing the job history recorded by the job history recording unit 305.

Since the job history recording unit 305 is an additional function of the printer driver 303, if the job history recording unit 305 is not added to the PC 101, the job history is not recorded when the printer driver 303 performs print processing. In such a case, the agent unit 306 does not transmit the job history to the data processing server 104. The above-described job history record supporting PC indicates the PC 101 in which the job history recording unit 305 has been added, and the job history record non-supporting PC indicates the PC 101 in which the job history recording unit 305 has not been added.

FIG. 3B is a functional block diagram illustrating the printer 102 when performing the print processing.

Referring to FIG. 3B, a print data receiving unit 311 (hereinafter referred to as a receiving unit 311) receives the print job from the PC 101.

A print data analysis unit 312 (hereinafter referred to as an analysis unit 312) analyzes the print data received by the receiving unit 311, then determines processing conditions, and performs an image forming process. More specifically, the analysis unit 312 determines whether the recorded flag 512 is included in the analyzed print data. If the recorded flag 512 is included, the analysis unit 312 transmits the print data to an attribute information recording unit 313. The print data may be also transmitted to an agent unit 314. Further, the analysis unit 312 receives from the attribute information recording unit 313 a job history recording success notification (hereinafter referred to as a success notification) or a job history recording failure notification (hereinafter referred to as a failure notification). If the received notification is the success notification, the analysis unit 312 transmits the print data to a print execution unit 315. If the received notification is the failure notification, the analysis unit 312 does not transmit the print data to the print execution unit 315, discards the print data, and cancels the print processing of the printer 102. The success notification and the failure notification will be described below.

The attribute information recording unit 313 records, based on the analysis result of the analysis unit 312, the attribute information of the job in which printing is performed. Further, the attribute information recording unit 313 records in the print data a job history recording request 901 (hereinafter referred to as a recording request 901, illustrated in FIG. 9 to be described below) for requesting the multifunction peripheral 103 to record the content information. Further, the attribute information recording unit 313 transmits to the print data analysis unit 312 the success notification or the failure notification received from the agent unit 314.

The agent unit 314 (i.e., a transmission unit) transmits to the multifunction peripheral 103 the print data received from the attribute information recording unit 313. Further, if the print data is received from the analysis unit 312, the agent unit 314 transmits the received print data to the multifunction peripheral 103. Furthermore, the agent unit 314 receives from the multifunction peripheral 103 the success notification or the failure notification, and transmits the received notification to the attribute information recording unit 313.

The print execution unit 315 performs printing based on the print data received from the analysis unit 312.

FIG. 3C is a functional block diagram illustrating the multifunction peripheral 103 when performing print processing.

Referring to FIG. 3C, a print data receiving unit 321 (hereinafter referred to as a receiving unit 321) receives the print data from the PC 101 or the printer 102, and transmits the received print data to a print data analysis unit 322. Further, the receiving unit 321 notifies the printer 102 of whether the multifunction peripheral 103 has succeeded in recording the job history with respect to the received print data. More specifically, the receiving unit 321 transmits to the agent unit 314 in the printer 102 the success notification or the failure notification received from the print data analysis unit 322 in the multifunction peripheral 103.

The print data analysis unit 322 (hereinafter referred to as the analysis unit 322) analyzes the print data received from the receiving unit 321, determines the processing conditions, and performs the image forming process. Further, if the analyzed print data includes the recording request 901, the analysis unit 322 transmits the print data to a print execution unit 325. If the analyzed print data does not include the job history recording request 901, the analysis unit 322 transmits the print data to a job history recording unit 323. The job history recording request 901 will be described in detail below. Furthermore, the analysis unit 322 receives the success notification or the failure notification from the job history recording unit 323, and transmits the notification to the receiving unit 321.

The job history recording unit 323 receives the print data from the print data analysis unit 322, and records the job history based on the print data. Further, the job history recording unit 323 is also capable of recording the content information based on the print data, combining the attribute information extracted from the received print data and the content information, and recording the job history. If the job history recording unit 323 succeeds in recording the job history, the job history recording unit 323 transmits the success notification to the analysis unit 322. If the job history recording unit 323 fails to record the job history, the job history recording unit 323 transmits the failure notification to the analysis unit 322. The recording unit 323 then transmits the recorded job history to an agent unit 324. If there is a job history which has been partially recorded even when the job history recording unit 323 has failed to record the job history, the job history recording unit 323 transmits the partially recorded job history to the agent unit 324.

The agent unit 324 transmits to the data processing server 104 the job history received from the job history recording unit 323.

The print execution unit 325 performs printing based on the analysis result of the analysis unit 322.

Figure 4A:
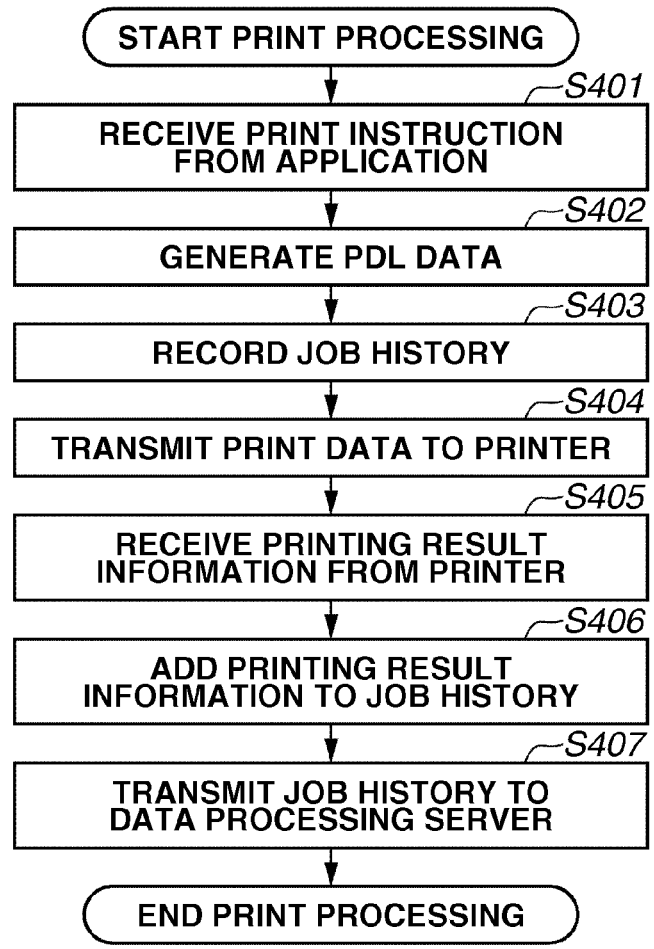
FIG. 4A is a flowchart illustrating print processing with respect to the printer 102 performed by the PC 101 in the case where a printer driver supporting recording of the job history is used.
Figure 4B:
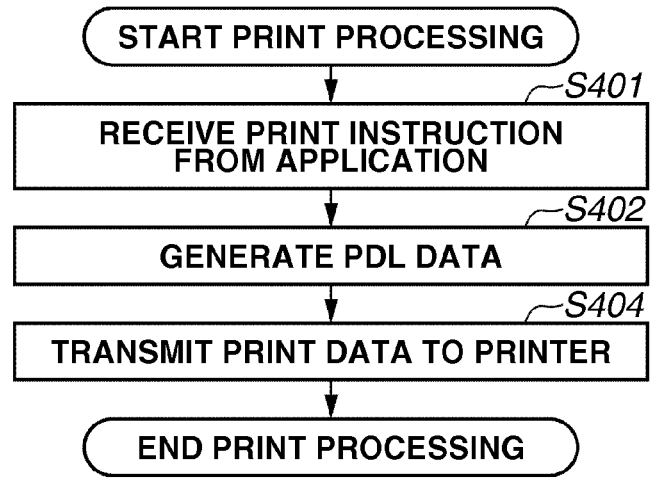
FIG. 4B is a flowchart illustrating print processing with respect to the printer 102 performed by the PC 101 in the case where a printer driver not supporting recording of the job history is used.

FIGS. 4A and 4B are flowcharts illustrating print processing performed by the PC 101 with respect to the printer 102. The CPU 201 reads the program stored in the ROM 202 or the external storage device 204 and performs the steps to be described below.

The print processing performed by the job history record supporting PC 101 will be described below with reference to FIG. 4A.

In step S401, the user of the PC 101 executes a print function of the application 301. The printer driver 303 in the PC 101 thus receives the print data and the print request from the application 301.

In step S402, the printer driver 303 generates page description language (PDL) data interpretable by the printer 102, based on the received print request and print data. The printer driver 303 then transmits the generated PDL data to the spooler 304. Further, the printer driver 303 transmits the received print data and print request to the job history recording unit 305.

In step S403, job history recording unit 305 records the job history based on the print data and the print request received from the printer driver 303. Further, the job history recording unit 305 records in the received print data and transmits to the printer driver 303 the recorded flag 512 indicating that the job history has been recorded. The recorded flag 512 will be described below.

In step S404, the spooler 304 transmits to the printer 102 the print data including the recorded flag 512 received from the job history recording unit 305 via the printer driver 303.

In step S405, the printer driver 303 receives from the printer 102 via the spooler 304 the information on an execution result of the print data transmitted in step S404. The printer driver 303 then transmits to the job history recording unit 305 the received execution result of the print processing based on the print data (i.e., a job execution result 604 illustrated in FIG. 6 to be described below).

In step S406, the job history recording unit 305 adds to a job history 601 (illustrated in FIG. 6) recorded in step S403 the job execution result 604 received from the printer driver 303. More specifically, the job execution result 604 is the information on whether an error has occurred in the print processing performed by the printer 102. The job execution result 604 cannot be obtained in step S403, i.e., before the printer 192 performs printing. Further, the job history recording unit 305 transmits to the agent unit 306 the job history 601 in which the job execution result 604 is recorded.

In step S407, the agent unit 306 transmits to the data processing server 104 the job history 601 updated in step S406. Upon the agent unit 306 transmitting the job history 601, the print processing ends.

According to the flowchart illustrated in FIG. 4A, the job history 601 recorded in step S403 is updated in step S407 and then transmitted to the data processing server 104. However, the data processing server 104 may update the job history 601. More specifically, after the job history 601 is recorded and transmitted to the data processing server 104 in step S403, the printing result received in step S405 may be transmitted to the data processing server 104 in step S407, so that the data processing server 104 updates the job history.

Further, in FIG. 4A, the job history transmission process performed in step S407 is described as part of print processing. However, the job history may be transmitted asynchronously with performing print processing. For example, the PC 101 may store the job history recorded thereby, and transmit the job history at predetermined timing.

Print processing performed by the job history record non-supporting PC 101 will be described below with reference to FIG. 4B. The same number will be assigned to steps if processing contents illustrated in FIG. 4B are similar to those illustrated in FIG. 4A.

In step S401 and step S402, the same processes are performed as in step S401 and step S402 illustrated in FIG. 4A.

Since print processing is performed using the job history record non-supporting PC in the flowchart illustrated in FIG. 4B, the job history is not recorded after performing step S402, and the process proceeds to step S404.

In step S404, the spooler 304 transmits to the printer 102 the print data including the PDL data generated in step S402, similarly as in the process illustrated in FIG. 4A. Upon transmitting the print data, the process ends.

The processes illustrated in the flowcharts of FIGS. 4A and 4B are print processing performed by the PC 101 with respect to the printer 102. However, the PC 101 similarly performs print processing with respect to the multifunction peripheral 103.

Figure 5:
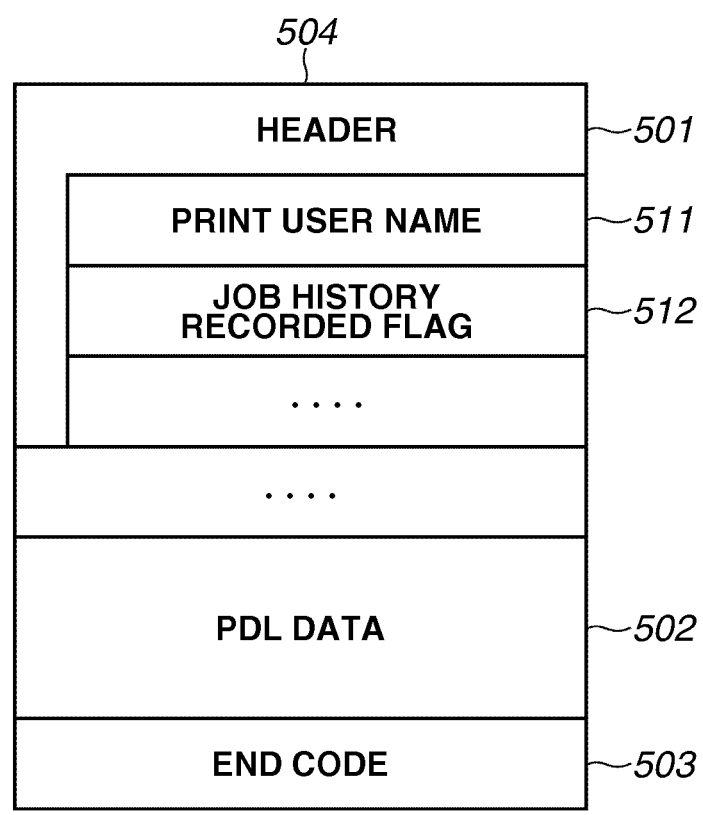
FIG. 5 illustrates an example of the print data transmitted from the PC 101 to the printer 102.

FIG. 5 illustrates an example of the print data which the job history recording PC 101 transmits to the printer 102 including the attribute information recording unit 313, or the multifunction peripheral 103. The printer 102 or the multifunction peripheral 103 performs printing based on print data 504 illustrated in FIG. 5.

Referring to FIG. 5, a header 501 includes a print user name 511, the recorded flag 512, and various types of information on printing (not illustrated).

The print user name 511 indicates the user using the PC 101.

The recorded flag 512 is the identification information indicating whether the result of printing based on the print data 504 has been previously recorded as the job history. If the printer driver 303 in the PC 101 has recorded the job history, a true-false value of the recorded flag 512 becomes "true", and if not, the true-false value of the recorded flag 512 becomes "false". Further, if the PC 101 is the job history record non-supporting PC, the recorded flag 512 is not included in the print data. For example, if a setting is specified so that the PC 101 which is a job history record supporting PC does not record the job history, the recorded flag 512 becomes "false".

PDL data 502 is the information indicating the print content in the PDL.

An end code 503 is the specific code indicating the end of the print data.

The structure of the print data is different depending on the type of the printer 102, and the information included in the print data 504 and a position in which the information is included are not limited to the example illustrated in FIG. 5. For example, the information on a user password (not illustrated) may be included as information in the print data 504. Further, it is not necessary for the print user name to be included in the print data. Furthermore, the print user name 511 may be located between the header 501 and the end code instead of being included in the header 501.

FIG. 6 illustrates an example of the job history which the PC 101 transmits to the data processing server 104.

Referring to FIG. 6, the job history 601 mainly includes attribute information 602 indicating the various types of information associated with the execution of the job, and content information 603 indicating the content of the document handled as the job. More specifically, the attribute information 602 includes the information such as job history identification (ID), a job execution user name, and the job execution result. Further, the content information 603 includes the image data and the text data.

The job history 601 illustrated in FIG. 6 indicates that a "User001" printed 4 sheets on the printer 102 at 17:13 on Sep. 30, 2007. The job history ID, the job execution user, and the content information in the job history 601 are the information recorded by the printer driver 303 in the PC 101 when executing the job. More specifically, the information is recorded in step S403 illustrated in FIG. 4A. Further, the number of printed sheets and the job execution result are information obtained from the printer 102 in step S406.

Figure 7:
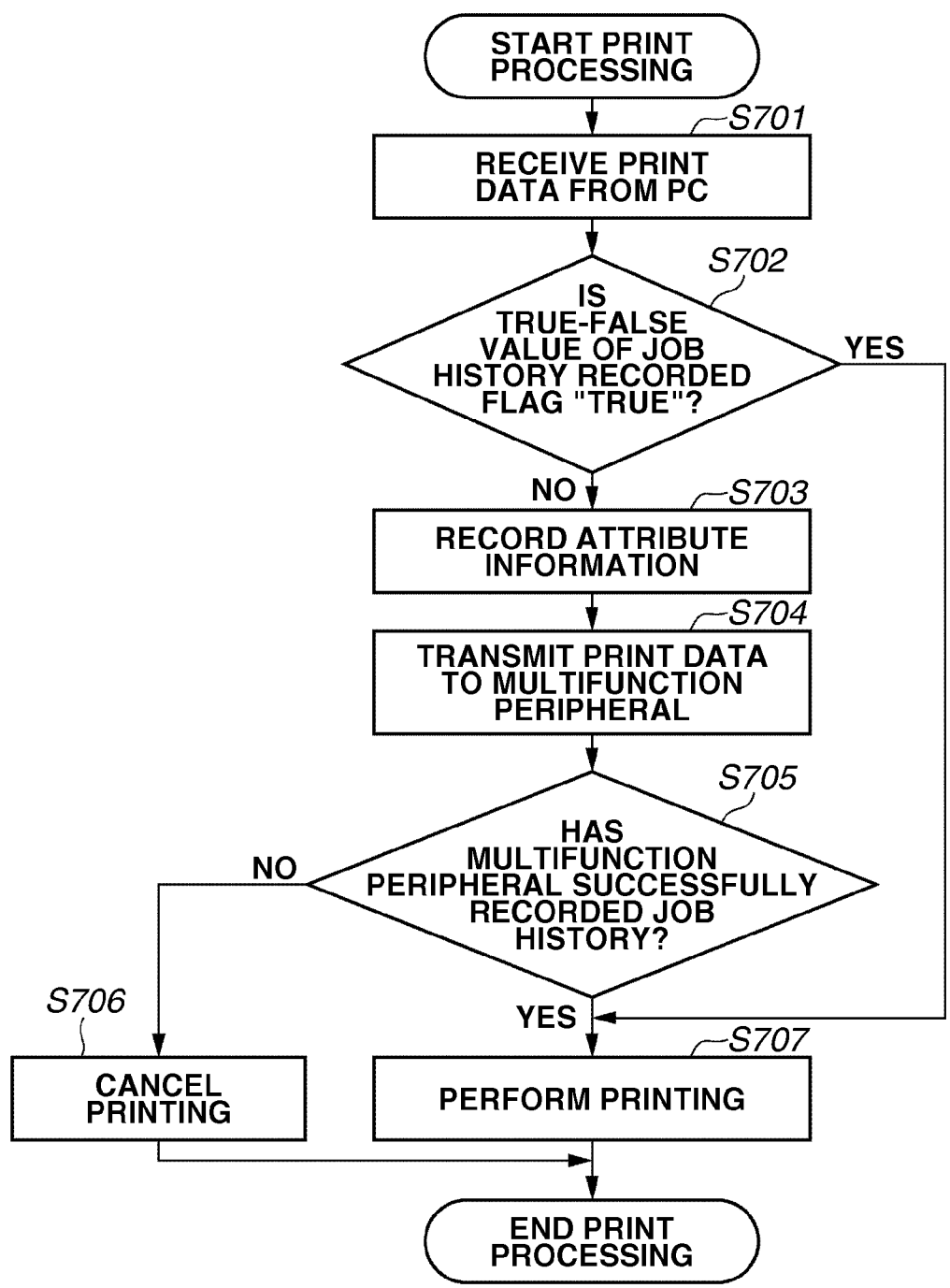
FIG. 7 is a flowchart illustrating print processing performed by the printer 102 according to a first exemplary embodiment.

FIG. 7 is a flowchart illustrating the print processing performed by the printer 102 according to the first exemplary embodiment. The CPU 201 reads the program stored in the ROM 202 or the external storage device 204 and performs the steps to be described below.

The process illustrated in the flowchart of FIG. 7 is performed by the printer 102 after the PC 101 transmits the print data to the printer 102 in step S404 illustrated in FIGS. 4A and 4B. The printer 102 performing the print processing illustrated in FIG. 7 is capable of recording the attribute information, including the attribute information in the print data, and transmitting the print data to the multifunction peripheral 103.

In step S701, the print data receiving unit 311 receives the print data 504 from the PC 101. The print data 504 is the print data which the PC 101 has transmitted in step S404 illustrated in FIGS. 4A and 4B.

In step S702, the analysis unit 312 determines whether the true-false value of the recorded flag 512 included in the print data 504 received from the receiving unit 311 is "true". If the true-false value of the recorded flag 512 is "true" (YES in step S702), it is unnecessary to record the job history, and the process proceeds to step S707. On the other hand, if the true-false value of the recorded flag 512 is "false" (NO in step S702), or the recorded flag 512 does not exist, it is necessary to record the job history. The process then proceeds to step S703.

In step S703, the attribute information recording unit 313 records attribute information 801 (illustrated in FIG. 8A) of the job to be executed by the printer 102 based on the print data 504 received in step S701, and includes the recorded attribute information 801 in the print data 504. The attribute information 801 will be described below. Further, the attribute information recording unit 313 includes in the print data 504 the recording request 901 for requesting the multifunction peripheral 103 to record the job history. The attribute information recording unit 313 thus transmits to the agent unit 314 print data 903 (illustrated in FIG. 9) including the attribute information and the recording request 901. The print data 903 indicates the print data obtained by including the attribute information 801 and the recording request 901 in the print data 504. The print data 903 will be described below.

In step S704, the agent unit 314 transmits to the receiving unit 321 in the multifunction peripheral 103 the print data 903 received from the attribute information recording unit 313. The printer 102 stores as setting information 1101 illustrated in FIG. 11, an address of the multifunction peripheral 103 to which the print data 903 is to be transmitted. The setting information 1101 stored in the printer 102 will be described below.

In step S705, the agent unit 314 receives from the receiving unit 321 in the multifunction peripheral 103 the success notification or the failure notification. If the success notification is received from the receiving unit 321 (YES in step S705), the process proceeds to step S707. If the failure notification is received (NO in step S705), the process proceeds to step 706.

In step S706, the print execution unit 315 receives the failure notification from the agent unit 314 via the recording unit 323. The print execution unit 315 then cancels the print processing based on the print data 504 received in step S701. As a result, printing is prevented from being executed without recording the job history.

In step S707, the print execution unit 315 receives the success notification from the agent unit 314 via the recording unit 323. The print execution unit 315 then performs printing based on the print data 504 received in step S701.

FIG. 8A illustrates an example of the attribute information recorded by the printer 102. More specifically, FIG. 8A illustrates the attribute information 801 recorded in the process of step S703 illustrated in FIG. 7. The attribute information 801 recorded by the printer 102 includes the information on which user has issued the print request to the printer 102, and when the user has issued the request.

FIG. 8B illustrates an example of the job history which has been combined by the multifunction peripheral 103. Referring to FIG. 8B, the job history 811 includes attribute information 812 and content information 813. The combining of the job history will be described below. The job history 811 is obtained by combining the attribute information 801 recorded by the printer 102 and the content information 813 recorded by the multifunction peripheral 103. A job start time 815 is thus the same as a job start time 803 illustrated in FIG. 8A.

A job execution result 802 illustrated in FIG. 8A and a job execution result 814 illustrated in FIG. 8B are blank, unlike the execution result 604 illustrated in FIG. 6, for the following reason. Since the attribute information 801 and the job history 811 including the attribute information 812 are recorded before the printer 102 performs printing, the print execution result cannot be obtained.

Figure 9:
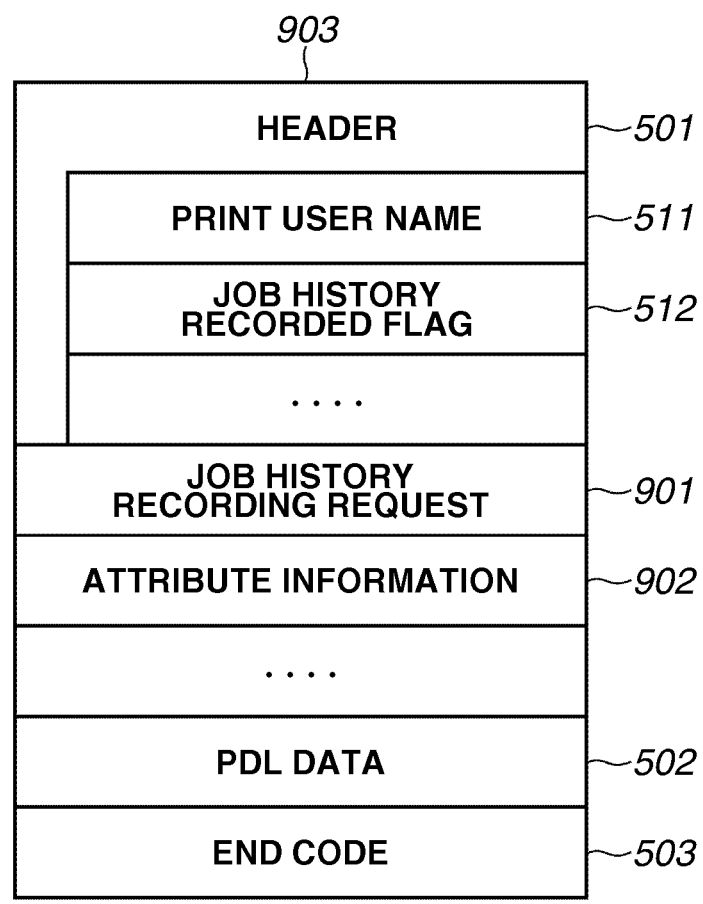
FIG. 9 illustrates an example of the print data transmitted from the printer 102 to the digital multifunction peripheral 103 according to the first exemplary embodiment.

FIG. 9 illustrates an example of the print data which the printer 102 transmits to the multifunction peripheral 103. Referring to FIG. 9, the basic structure of the print data 903 is similar to that of the print data 504 illustrated in FIG. 5. The same reference numbers are thus assigned to the elements which are the same as those illustrated in FIG. 5, and description will be omitted. However, if the print data that can be processed by the printer 102 and the print data that can be processed by the multifunction peripheral 103 are different, the elements having the same reference numbers as in FIG. 5 may be different from FIG. 5 in detail.

The recording request 901 indicates the information for causing the multifunction peripheral 103 to record the job history. The recording request 901 is the information which is included in the print data in step S703 illustrated in FIG. 7.

Attribute information 902 is the attribute information 801 illustrated in FIG. 8A recorded by the printer in step S703.

Figure 10:
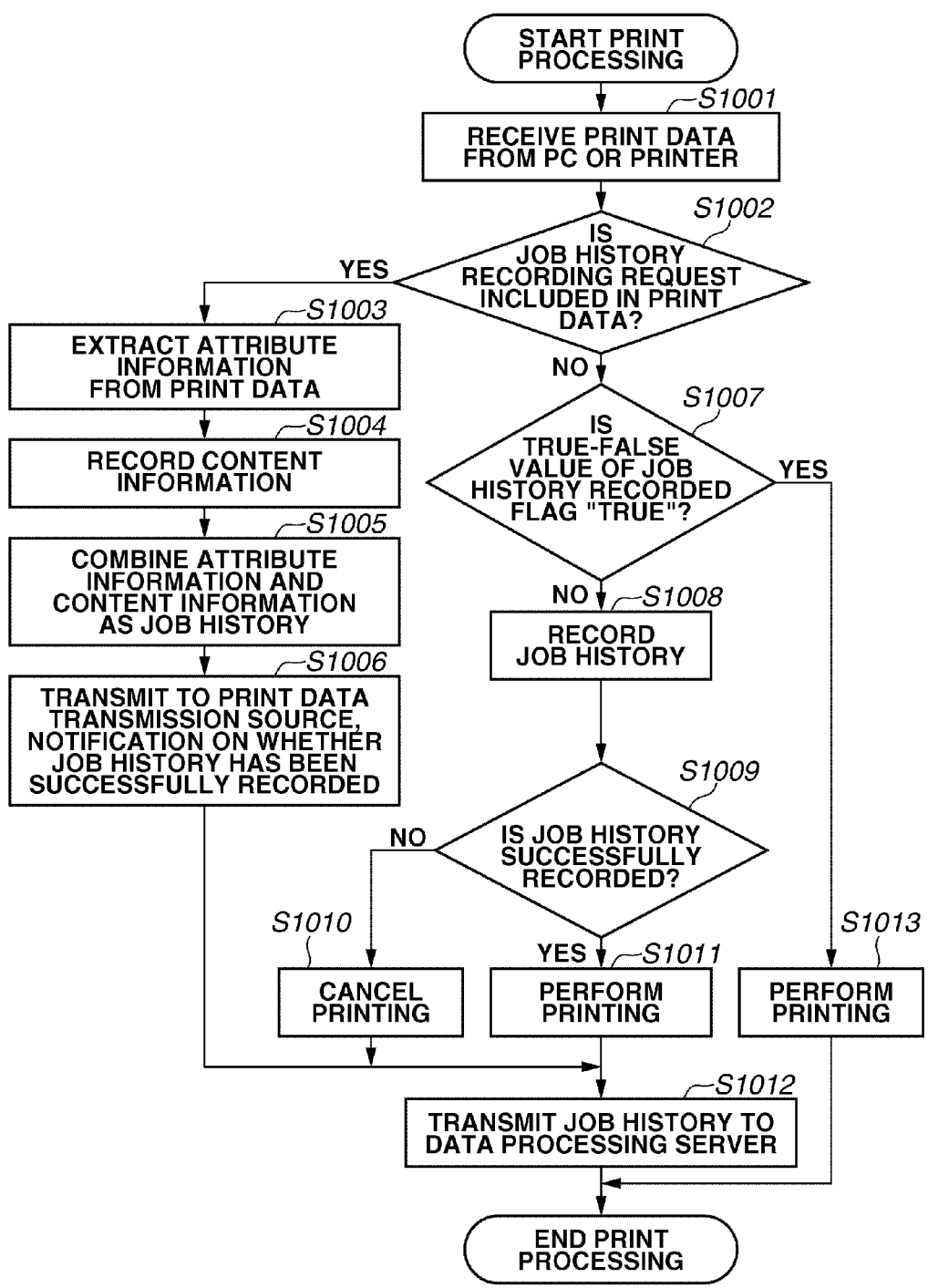
FIG. 10 is a flowchart illustrating the print processing performed by the digital multifunction peripheral 103 according to the first exemplary embodiment.

FIG. 10 is a flowchart illustrating the print processing performed by the multifunction peripheral 103 according to the first exemplary embodiment. The CPU 201 reads the program stored in the ROM 202 or the external storage device 204 and performs the steps to be described below.

In step S1001, the receiving unit 321 receives the print data from the PC 101 or the printer 102. If the print data is received from the PC 101, the receiving unit 321 receives the print data 504 illustrated in FIG. 5, and if the print data is received from the printer 102, the receiving unit 321 receives the print data 903 illustrated in FIG. 9. The receiving unit 321 then transmits the received print data to the analysis unit 322.

In step S1002, the analysis unit 322 determines whether the recording request 901 is included in the print data received from the receiving unit 321. If the recording request 901 is included in the received print data (YES in step S1002), the process proceeds to step S1003. If the recording request 901 is not included in the received print data (NO in step S1002), the process proceeds to step S1007. Here, the case where the recording request 901 is included in the print data refers to the case where the print data 903 is received from the printer 102. Further, the case where the recording request 901 is not included in the print data refers to the case where the print data 504 is received from the PC 101.

In step S1003, the analysis unit 322 extracts the attribute information 902 from the print data 903 received in step S1001. Further, the analysis unit 322 transmits to the job history recording unit 323 the extracted attribute information 902 and the analyzed print data.

In step S1004, the job history recording unit 322 records the content information based on the PDL data 502 included in the print data 903 received from the analysis unit 322.

In step S1005, the job history recording unit 323 combines as the job history the attribute information 902 extracted in step S1003 and the content information recorded in step S1004. The combined job history is the job history 811 illustrated in FIG. 8B. The job history 811 includes the attribute information and the content information similarly as in the job history 601 illustrated in FIG. 6.

In step S1006, the job history recording unit 323 notifies the printer 102, i.e., a transmission source of the print data 903, of the information indicating whether the job history recording process performed in step S1005 has been successful. More specifically, the job history recording unit 323 transmits to the receiving unit 321 via the analysis unit 322 the success notification or the failure notification with respect to the job history recording process. The receiving unit 321 then transmits the received notification to the agent 314 in the printer 102. The printer 102 determines based on the success or failure notification on the job history recording process transmitted in step S1006, whether to perform printing in step S705 in the flowchart illustrated in FIG. 7. After the job history recording unit 323 transmits the success notification or the failure notification with respect to the job history recording process, the process proceeds to step S1012.

In step S1007, the analysis unit 322 determines whether the true-false value of the recorded flag 512 included in the print data 504 received in step S1001 is "true". If the true-false value of the recorded flag 512 is "true" (YES in step S1007), the analysis unit 322 transmits the print data to the print execution unit 325, and the process proceeds to step S1013. On the other hand, if the true-false value of the recorded flag 512 is "false" (NO in step S1007), or the recorded flag 512 is not included in the print data 504, the analysis unit 322 transmits the print data to the job history recording unit 323. The process then proceeds to step S1008.

In step S1008, job history recording unit 323 records the job history of the job to be executed by the multifunction peripheral 103 based on the print data 504 received from the analysis unit 322. Further, the job history recording unit 323 transmits to the analysis unit 322 the notification on whether the job history recording process has succeeded. In step S1009, the analysis unit 322 determines whether the received notification is the success notification or the failure notification. If the analysis unit 322 has received the failure notification (NO in step S1009), the process proceeds to step S1010. If the analysis unit 322 has received the success notification (YES in step S1009), the analysis unit 322 transmits the print data to the print execution unit 325. The process then proceeds to step S1011.

In step S1010, the analysis unit 322 does not transmit the print data to the print execution unit 325, and cancels printing. The process then proceeds to step S1012.

In step S1011, the print execution unit 325 performs printing based on the received print data. After performing printing, the process proceeds to step S1012.

In step S1012, the multifunction peripheral 103 transmits to the data processing server 104 the job history recorded in step S1008. Further, if the job history recording process performed in step S1008 has failed while performing the process, and the partially recorded job history is remaining, the multifunction peripheral 103 transmits the partially recorded job history to the data processing server 104. If the job history recording unit 323 cannot record the job history, the print processing may end without proceeding to step S1012 after cancelling printing in step S1010. Furthermore, the flowchart in FIG. 10 illustrates the job history transmission process performed in step S1012 as part of the print processing. However, the job history may be transmitted asynchronously with performing the print processing. For example, the PC 101 may store the job history recorded by the multifunction peripheral 103, and transmit the job history at the predetermined timing.

In step S1013, since the recorded flag 512 included in the print data is "true", and the PC 101 has previously recorded the job history, the multifunction peripheral 103 performs printing based on the received print data. The print processing performed by the multifunction peripheral 103 thus ends.

According to the above-described process, if the recording request 901 is included in the received print data 903, the multifunction peripheral 103 combines as the job history the attribute information 902 included in the print data and the content information recorded by the multifunction peripheral 103. The multifunction peripheral 103 then transmits the job history to the data processing server 104. In such a case, the multifunction peripheral 103 does not perform printing. On the other hand, if the recording request 901 is not included in the received print data, the multifunction peripheral 103 determines, using the value of the recorded flag 512 in the print data, whether to record the job history or perform printing. Further, if none of the PC 101, the printer 102, and the multifunction peripheral 103 has recorded the job history, printing is cancelled.

FIG. 11 illustrates an example of the setting information stored in the printer 102. Referring to FIG. 11, the setting information 1101 includes the information on the printer 102 (e.g., a device ID and a model name), information on an administrator of the printer 102 (e.g., an administrator name and an administrator e-mail address), and address information when the print data is transmitted in step S704 illustrated in FIG. 7 (i.e., a transmission destination of the print data including the recording request 901).

Such settings are stored in the external storing device 204 included in the printer 102. The settings are displayed on the display device 206, and the administrator changes the settings via the input device 205 as necessary.

As described above, according to the first exemplary embodiment, the job history is prevented from not being recorded even when printing is performed using the printer 102 from the job history record non-supporting PC. Omitting to record the job history is prevented by the printer 102 transferring the print data to the multifunction peripheral 103, and by the multifunction peripheral 103 recording the job history. Further, if printing is performed using the printer 102 from the job history record supporting PC, the printer 102 does not transmit the print data to the multifunction peripheral 103, so that the job history is prevented from becoming recorded twice.

The second exemplary embodiment according to the present invention will be described below. According to the second exemplary embodiment, the print processing performed by the printer 102 and the multifunction peripheral 103 after receiving the print data 504 from the PC 101 are different from those according to the first exemplary embodiment.

According to the first exemplary embodiment, if the PC 101 has not recorded the job history, the printer 102 receiving the print data 504 from the PC 101 performs printing after receiving from the multifunction peripheral 103 the notification that the job history has been recorded. In contrast, according to the second exemplary embodiment, the printer 102 performs printing without confirming whether the job history has been recorded by the multifunction peripheral 103. Further, upon performing printing, the printer 102 transmits to the multifunction peripheral 103 the print data including the attribute information. The multifunction peripheral 103 then receives the print data and records the job history. However, the multifunction peripheral 103 does not notify the printer 102 of whether the job history has been recorded, and the print processing ends.

Figure 12:
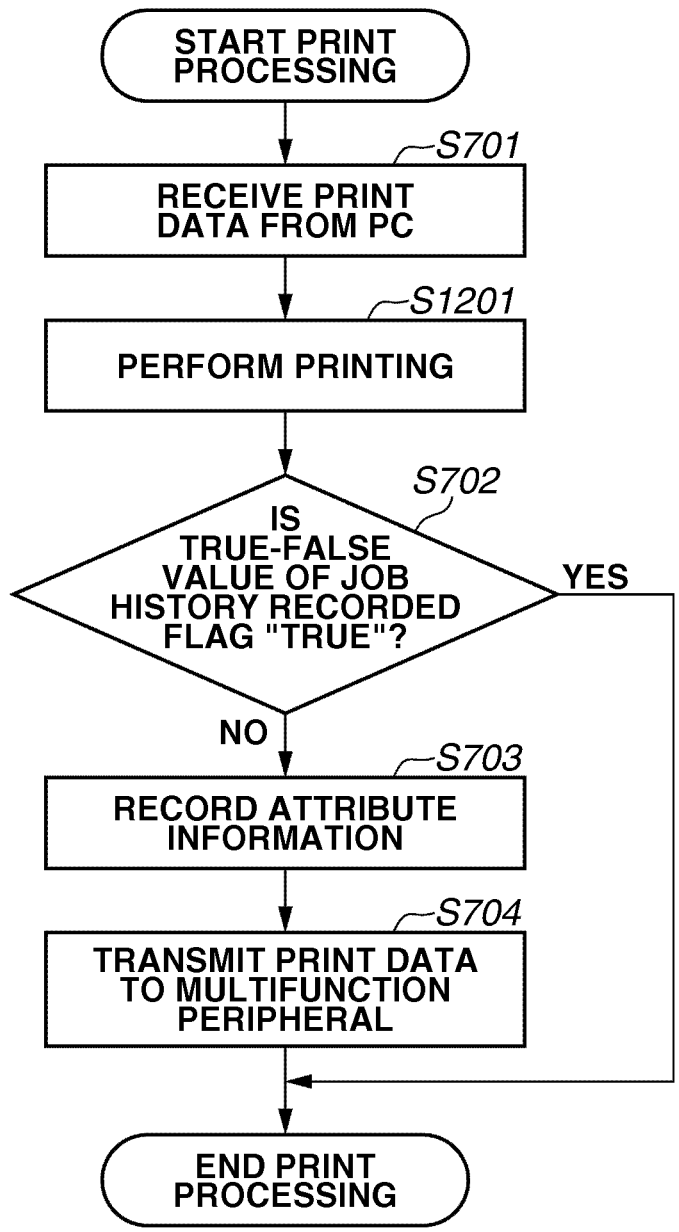
FIG. 12 is a flowchart illustrating print processing performed by the printer 102 according to a second exemplary embodiment.

FIG. 12 is a flowchart illustrating the print processing performed by the printer 102 according to the second exemplary embodiment. The same numbers will be assigned to the steps illustrated in FIG. 12 which perform the same processes as the steps illustrated in FIG. 7 according to the first exemplary embodiment. The CPU 201 reads the program stored in the ROM 202 or the external storage device 204 and performs the steps to be described below.

In step S701, the print data receiving unit 311 receives the print data 504 from the PC 101, and transmits the print data 504 to the analysis unit 312 in the printer 102. According to the second exemplary embodiment, after performing the process of step S701, the process proceeds to step S1201 before proceeding to step S702.

In step S1201, the print execution unit 315 performs printing based on the print data 504 received via the analysis unit 312. The process then proceeds to step S702.

In step S702, the analysis unit 312 determines whether the true-false value of the recorded flag 512 included in the print data 504 received from the receiving unit 311 is "true", similarly as in the first exemplary embodiment. If the true-false value of the recorded flag 512 is "true" (YES in step S702), it is unnecessary to record the job history, so that the print processing ends. On the other hand, if the true-false value of the recorded flag 512 is "false" (NO in step S702), or the recorded flag 504 does not exist, it is necessary to record the job history. The process thus proceeds to step S703.

The processes performed in step S703 and step S704 are the same as those according to the first exemplary embodiment. Further, if the print data 504 which is the same as in the first exemplary embodiment is printed under the same conditions, the attribute information recorded in step S703 becomes similar to the attribute information 801 illustrated in FIG. 8A. In step S704, the printer 102 transmits the print data 504 to the receiving unit 321 in the multifunction peripheral 103. The print processing then ends.

Figure 13:
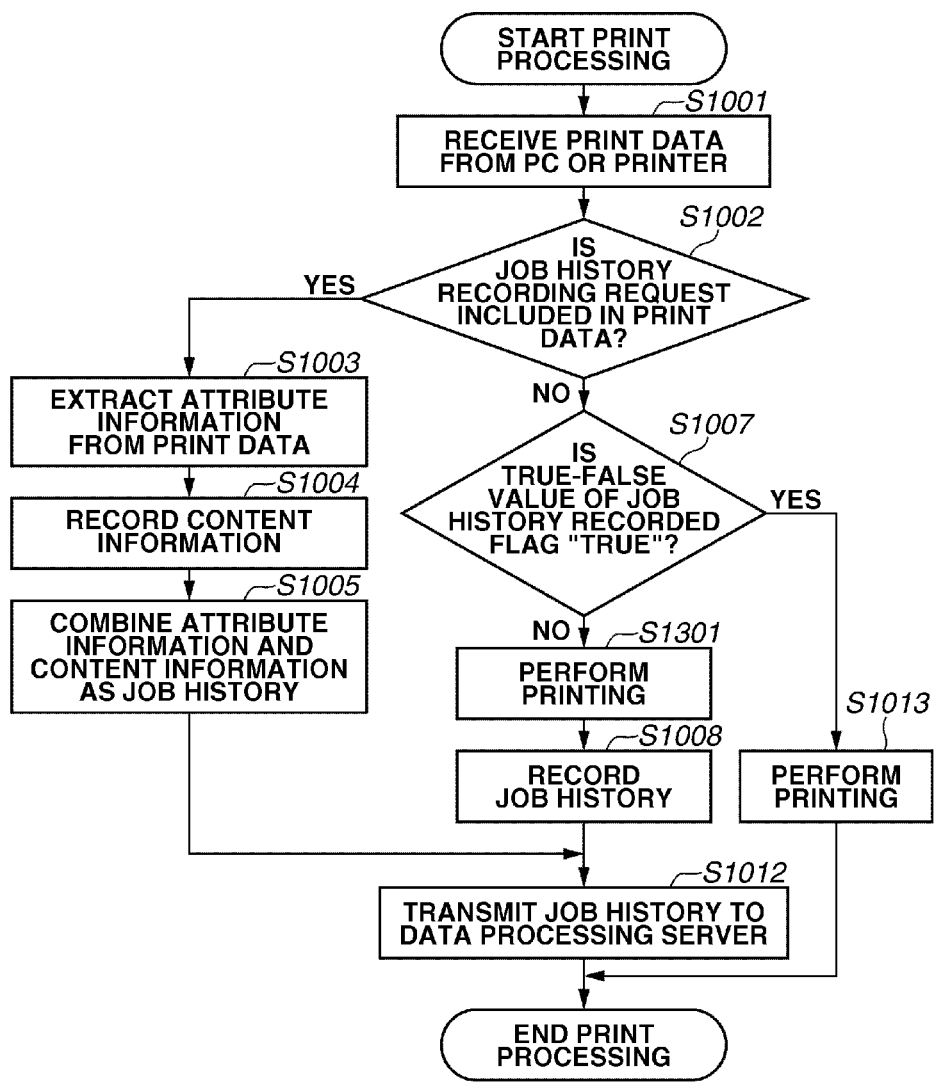
FIG. 13 is a flowchart illustrating print processing performed by the digital multifunction peripheral 103 according to the second exemplary embodiment.

FIG. 13 is a flowchart illustrating the print processing performed by the multifunction peripheral 103 according to the second exemplary embodiment. The same numbers will be assigned to the steps illustrated in FIG. 13 which perform the same processes as the steps illustrated in FIG. 10 according to the first exemplary embodiment. The CPU 201 reads the program stored in the ROM 202 or the external storage device 204 and performs the steps to be described below.

The processes performed in step S1001 and step S1002 are the same as those according to the first exemplary embodiment. In step S1002, if the analysis unit 312 determines that the print data 903 received in step S1001 includes the recording request 901 (YES in step S1002), the process proceeds to step S1003. The processes performed in step S1003 to step S1005 are the same as those according to the first exemplary embodiment. According to the first exemplary embodiment, after the job history recording unit 323 combines as the job history the attribute information and the content information in step S1005, the multifunction peripheral 103 transmits to the printer 102 the notification on whether the job history has been recorded. However, according to the second exemplary embodiment, the process proceeds to step S1012 without transmitting the notification on whether the job history has been recorded. In step S1012, the multifunction peripheral 103 transmits to the data processing server 104 the job history recorded in step S1005, and the print processing ends.

If it is determined in step S1002 that the recording request 901 is not included in the print data 903 (NO in step S1002), the process proceeds to step S1007. In step S1007, the analysis unit 322 determines whether the true-false value of the recorded flag 512 included in the print data 504 received in step S1001 is "true", similarly as in the first exemplary embodiment. If the analysis unit 322 determines that the true-false value of the recorded flag 512 is not "true" (NO in step S1007), the process proceed to step S1301. In step S1301, the print execution unit 325 performs printing based on the print data.

Upon performing printing, the process proceeds to step S1008. In step S1008, the job history recording unit 323 records the job history, and in step S1012, the agent unit 324 transmits to the data processing server 104 the recorded job history, and the print processing ends, similarly as in the first exemplary embodiment. According to the first exemplary embodiment, the multifunction peripheral 103 determines whether the job history recording has been successful and then performs printing. However, according to the second exemplary embodiment, if the multifunction peripheral 103 has received the print data 504 from the PC 101, the multifunction peripheral 103 prints the received print data 504 without determining as described above. If the print data which is the same as that in the first exemplary embodiment is printed under the same conditions, the job history transmitted in step S1012 becomes the same as the job history 601 illustrated in FIG. 6.

If the analysis unit 322 determines that the true-false value of the recorded flag 512 is "true" (YES in step S1007), the multifunction peripheral 103 performs printing similarly as in the first exemplary embodiment.

As described above, according to the second exemplary embodiment, when the printer 102 performs printing, whether the multifunction peripheral 103 has successfully performed the job history recording process is not confirmed. The time from receiving the print request by the user to performing printing by the printer 102 is thus shortened.

The third exemplary embodiment will be described below. According to the present exemplary embodiment, the print processing performed by the printer 102 in the case where the PC 101 has not recorded the job history is different from that according to the first exemplary embodiment. More specifically, if the true-false value of the recorded flag 512 included in the print data 504 received by the printer 102 is not "true", the printer 102 does not record the attribute information 801. The printer 102 transmits to the multifunction peripheral 103, print data 1501 (illustrated in FIG. 15 to be described below) including the job history recording request 901. Upon receiving the print data 1501, the multifunction peripheral 103 records both the attribute information and the content information of the job.

Figure 14:
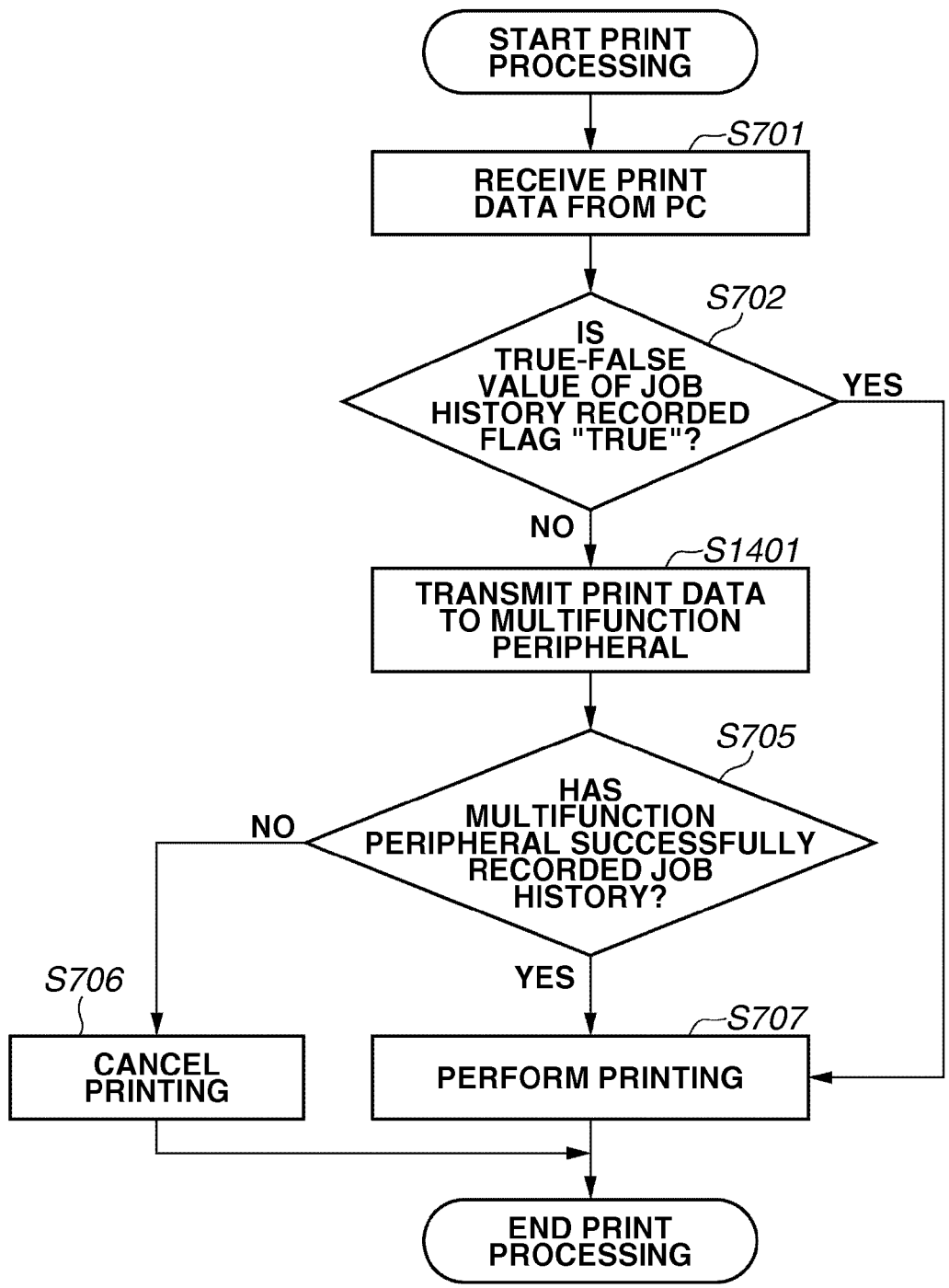
FIG. 14 is a flowchart illustrating print processing performed by the printer 102 according to a third exemplary embodiment.

FIG. 14 is a flowchart illustrating the print processing performed by the printer 102 according to the third exemplary embodiment. The same numbers will be assigned to the steps illustrated in FIG. 14 which perform the same processes as the steps illustrated in FIG. 7 according to the first exemplary embodiment. The CPU 201 reads the program stored in the ROM 202 or the external storage device 204 and performs the steps to be described below.

In step S701, the print data receiving unit 311 receives the print data 504 from the PC 101, and transmits the print data 504 to the analysis unit 312 in the printer 102, similarly as in the first exemplary embodiment.

In step S702, the analysis unit 312 receives the print data 504, and determines whether the true-false value of the recorded flag 512 included in the print data 504 is "true". If the true-false value of the recorded flag 512 is determined as not "true" (NO in step S702), the process proceeds to step S1401. In step S1401, the agent unit 314 transmits the received print data 504 to the multifunction peripheral 103. In step S705, if the failure notification is then received from the multifunction peripheral 103 (NO in step S705), the process proceeds to step S706, and the analysis unit 312 cancels the print processing, similarly as in the first exemplary embodiment. If the success notification is received (YES in step S705), the process proceeds to step S707, and the print execution unit 315 performs printing based on the print data 504 received from the analysis unit 312. If the true-false value of the recorded flag 512 is determined as "true" (YES in step S702), the process proceeds to step S707. In step S707, the print execution unit 315 performs printing based on the print data 504, and the print processing ends.

Figure 15:
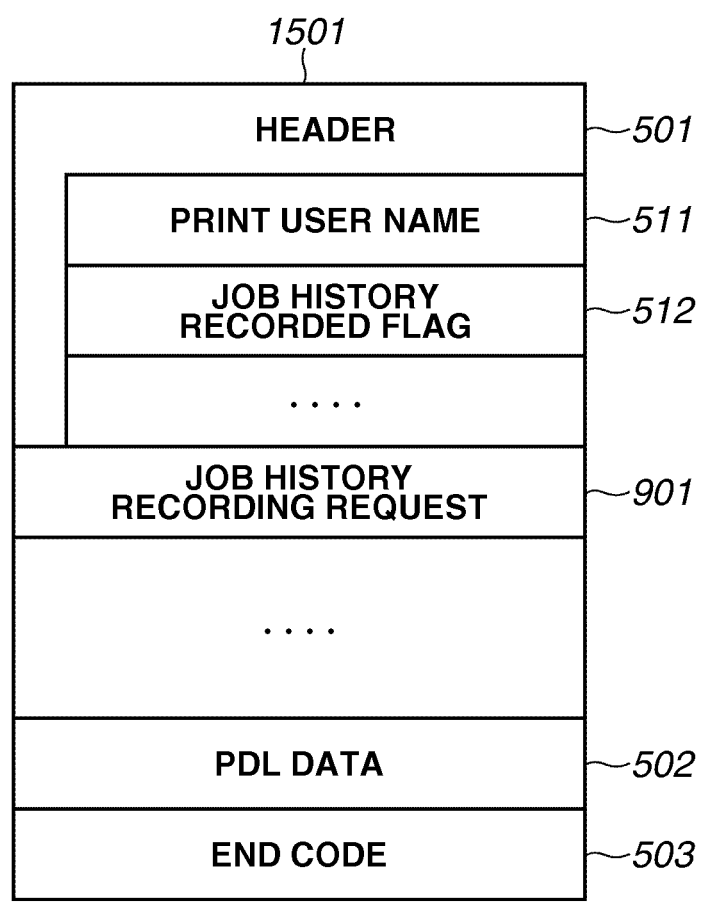
FIG. 15 illustrates an example of the print data transmitted from the printer 102 to the digital multifunction peripheral 103 according to the third exemplary embodiment.

FIG. 15 illustrates an example of the print data which the printer 102 transmits to the multifunction peripheral 103. Referring to FIG. 15, the basic structure of the print data 1501 is similar to that of the print data 903 illustrated in FIG. 9. The difference from the print data 903 is that the print data 1501 does not include the attribute information 902 due to the printer 102 not recording the attribute information in the print processing performed by the printer 102 illustrated in FIG. 14.

Figure 16:
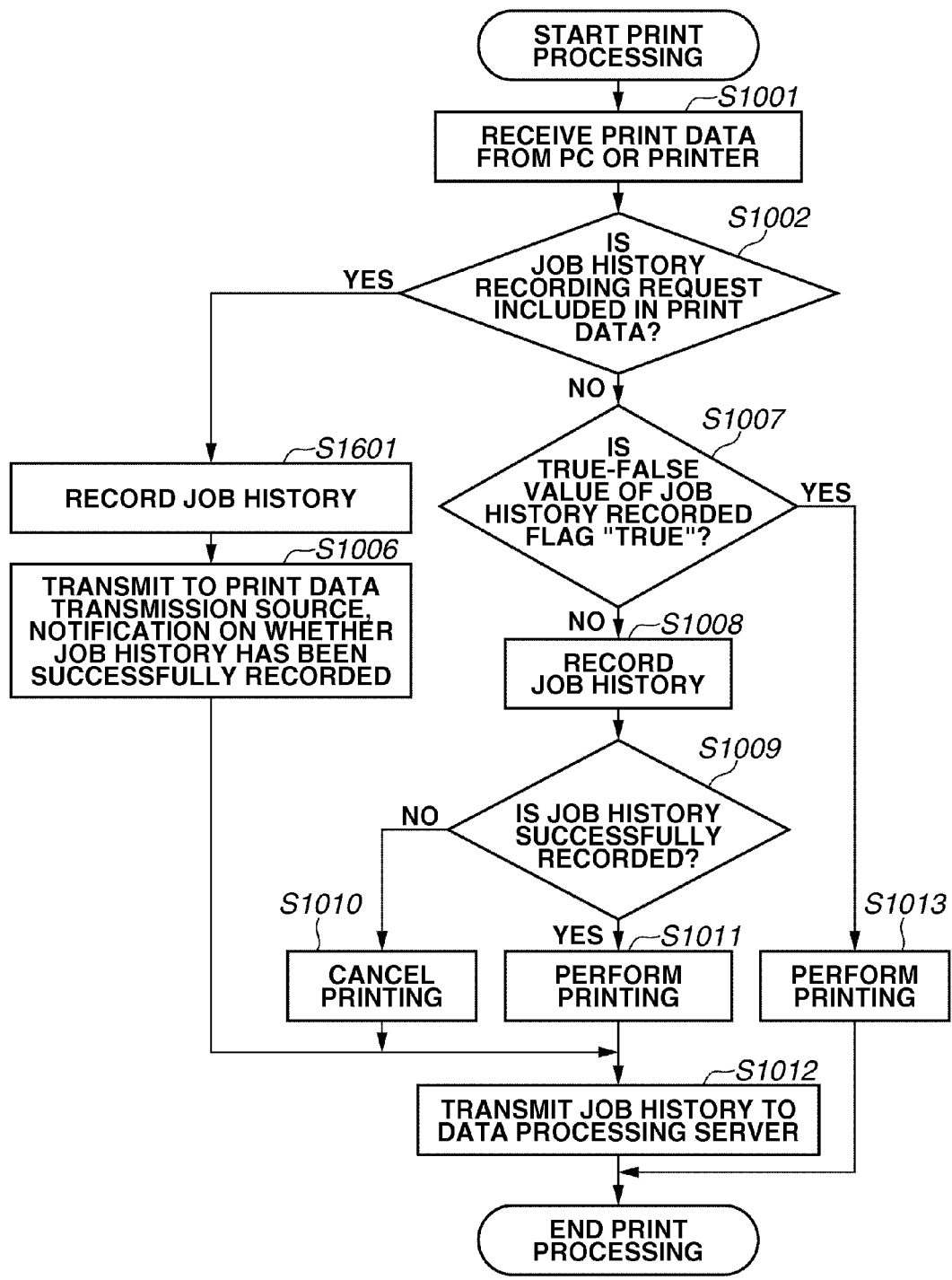
FIG. 16 is a flowchart illustrating print processing performed by the digital multifunction peripheral 103 according to the third exemplary embodiment.

FIG. 16 is a flowchart illustrating the print processing performed by the multifunction peripheral 103 according to the third exemplary embodiment. The same numbers will be assigned to the steps illustrated in FIG. 16 which perform the same processes as the steps illustrated in FIG. 10 according to the first exemplary embodiment. The CPU 201 reads the program stored in the ROM 202 or the external storage device 204 and performs the steps to be described below.

The processes performed in step S1001 and step S1002 are the same as those according to the first exemplary embodiment. In step S1002, if the analysis unit 322 determines that the print data 1501 includes the recording request 901 (YES in step S1002), the analysis unit 322 transmits the print data 1501 to the job history recording unit 323. The process then proceeds to step S1601. In step S1601, the job history recording unit 323 records job history 1701 (illustrated in FIG. 17 to be described below) of the job to be executed by the printer 102 based on the print data 1501.

The job history 1701 is the job history illustrated in FIG. 17. Referring to FIG. 17, a job start time 1702 in the job history 1701 is different from the job start time in the job history 811 illustrated in FIG. 8B which the multifunction peripheral 103 transmits to the data processing server 104 according to the first exemplary embodiment. More specifically, according to the third exemplary embodiment, since the multifunction peripheral 103 records the attribute information, the time at which the printer 102 has transmitted the print data to the multifunction peripheral 103 becomes the job start time in the job history 1701. Upon recording the job history, the process proceeds to step S1006, and the processes similar to the first exemplary embodiment are performed. If the analysis unit 322 determines that the print data 1501 does not include the recording request 901 (NO in step S1002), the processes are performed similarly as in the first exemplary embodiment.

As described above, according to the third exemplary embodiment, the multifunction peripheral 103 records the attribute information instead of the printer 102. The processing load on the printer 102 is thus reduced as compared to the first exemplary embodiment.

The third exemplary embodiment has been described as a derivation of the first exemplary embodiment. However, the third exemplary embodiment is also applicable to the second exemplary embodiment. More specifically, in such a case, the printer 102 does not record the attribute information in step S703 in the flowchart illustrated in FIG. 12. Further, the multifunction peripheral 103 does not perform the processes of step S1003 to step S1005 illustrated in FIG. 13, and records the job history similarly as in step S1601 illustrated in FIG. 16.

The fourth exemplary embodiment according to the present invention will be described below. According to the present exemplary embodiment, the printer 102 does not record the attribute information, unlike the first exemplary embodiment. Further, the printer 102 does not change the process with respect to performing printing based on whether the multifunction peripheral 103 has succeeded in recording the job history, unlike the first exemplary embodiment. According to the present exemplary embodiment, a Box function included in the multifunction peripheral 103 is employed. The printer 102 thus transmits to the multifunction peripheral 103 as a Box storing job, the print data received from the PC 101. The Box function is a document data management function of the multifunction peripheral 103. The Box function stores in the external storage device 204 of the multifunction peripheral 103 the print data received by the multifunction peripheral 103, and reprints the stored document. According to the fourth exemplary embodiment, there is an area (i.e., a storage area) in the external storage device 204 which stores the print data received from the printer 102. When the multifunction peripheral 103 stores in the storage area the print data received from the printer 102, the multifunction peripheral 103 records the history of a storing job which has stored the print data in the storing area, and transmits the job history to the data processing server 104. The print data stored in the storage area is automatically deleted after a predetermined time has elapsed. The job history may be transmitted every time the job history is recorded. Further, the recorded job history may be stored in the storage area and be transmitted to the data processing server 104 after a predetermined period has elapsed.

Figure 18:
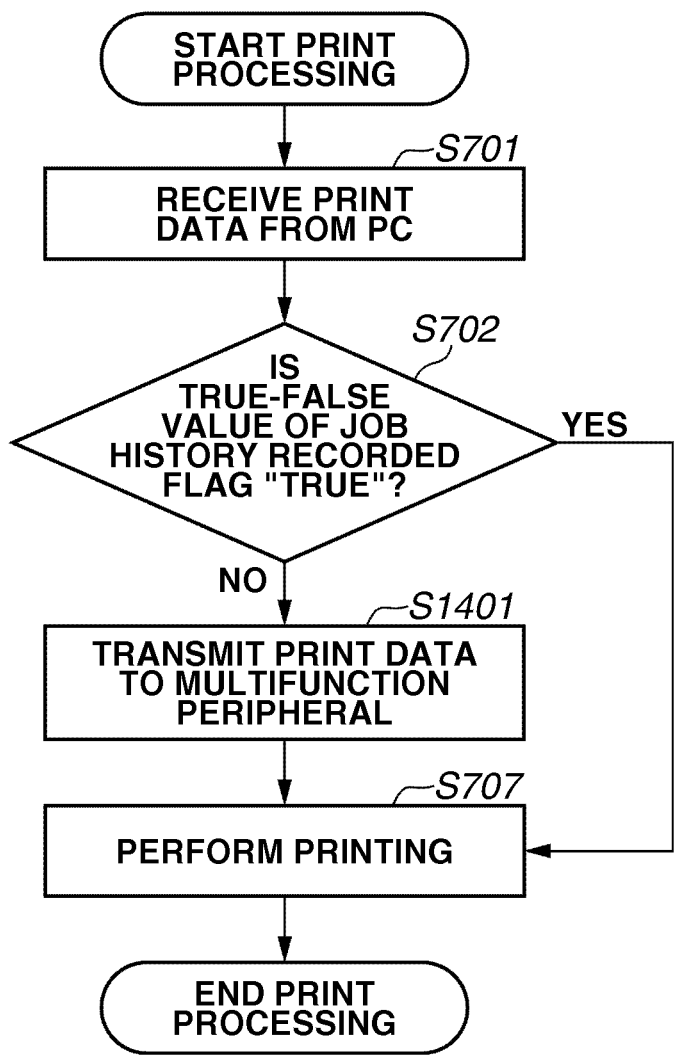
FIG. 18 is a flowchart illustrating print processing performed by the printer 102 according to a fourth exemplary embodiment.

FIG. 18 is a flowchart illustrating the print processing performed by the printer 102 according to the fourth exemplary embodiment. The same numbers will be assigned to the steps illustrated in FIG. 18 which perform the same processes as the steps illustrated in FIG. 7 according to the first exemplary embodiment. The CPU 201 reads the program stored in the ROM 202 or the external storage device 204 and performs the steps to be described below.

In step S701, the receiving unit 311 receives the print data 504 from the PC 101, and transmits the print data 504 to the analysis unit 312, similarly as in the first exemplary embodiment. In step S702, the analysis unit 312 determines whether the true-false value of the recorded flag 512 included in the received print data 504 is "true". If the true-false value of the recorded flag 512 is determined as "false" (NO in step S702), the process proceeds to step S1401. If the true-false value of the recorded flag 512 is determined as "true" (YES in step S702), the process proceeds to step S707, and the printer 102 performs printing.

In step S1401, the analysis unit 312 transmits to the multifunction peripheral 103, print data 1901 (illustrated in FIG. 19 to be described below), i.e., the print data 504 including a Box storing request 1902. The Box storing request 1902 is information for causing the multifunction peripheral 103 to store the print data 1901 in the storage area. Upon transmitting the print data 1901, in step S707, the print execution unit 315 performs printing based on the print data 504 received from the analysis unit 312.

Figure 19:
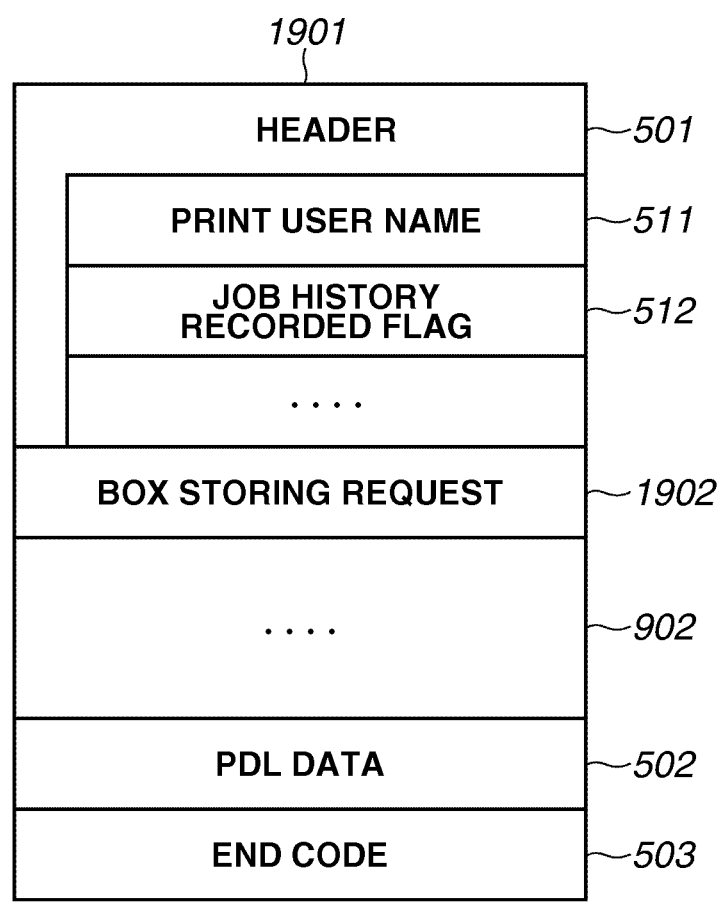
FIG. 19 illustrates an example of the print data transmitted from the printer 102 to the digital multifunction peripheral 103 according to the fourth exemplary embodiment.

FIG. 19 illustrates an example of the print data which the printer 102 transmits to the multifunction peripheral 103. Referring to FIG. 19, the basic structure of the print data 1901 is similar to that of the print data 903 illustrated in FIG. 9. The difference from the print data 903 is that the print data 1901 includes the Box storing request 1902 instead of the recording request 901.

Figure 20:
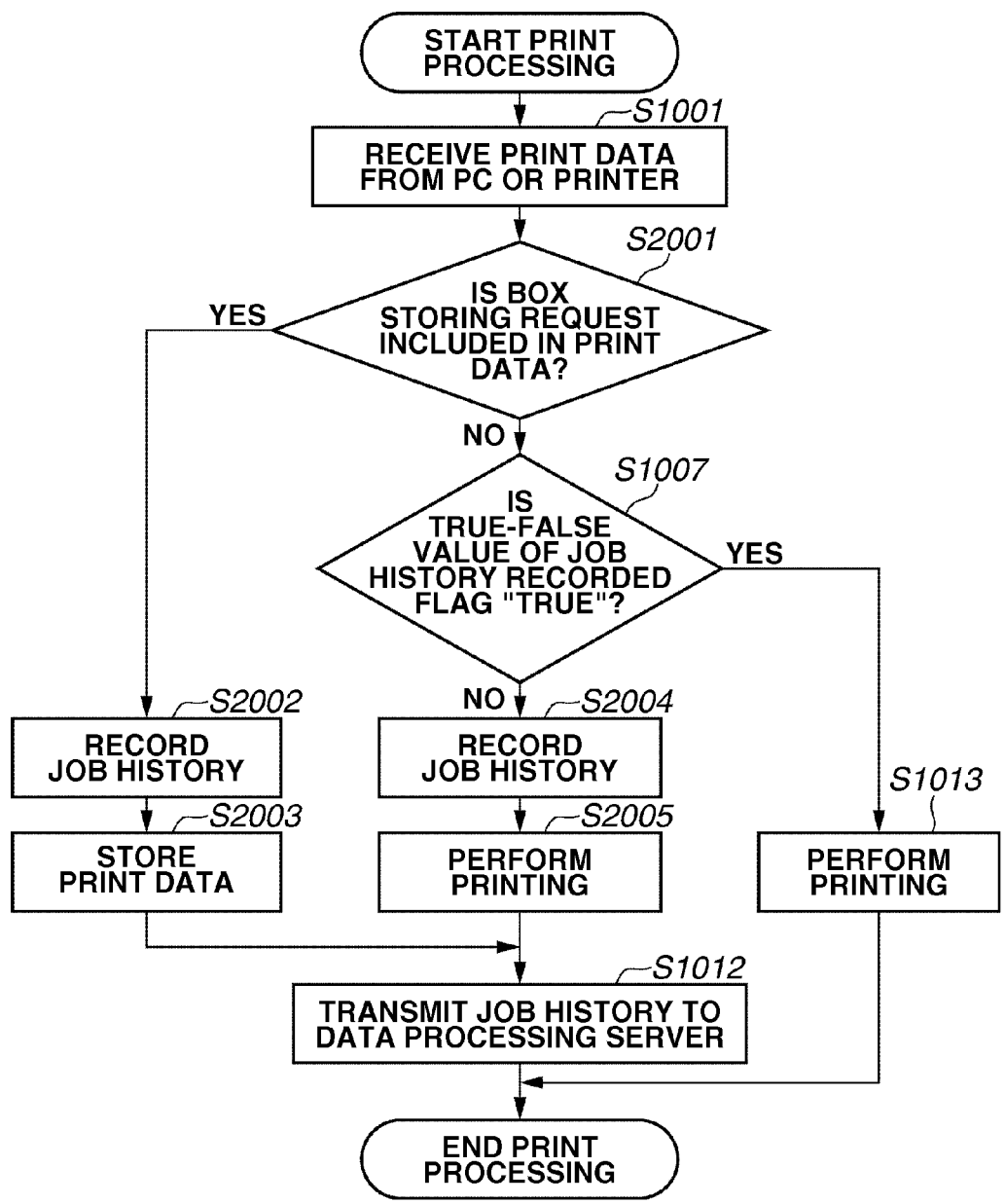
FIG. 20 is a flowchart illustrating print processing performed by the digital multifunction peripheral 103 according to the fourth exemplary embodiment.

FIG. 20 is a flowchart illustrating the print processing performed by the multifunction peripheral 103 according to the fourth exemplary embodiment. The same numbers will be assigned to the steps illustrated in FIG. 20 which perform the same processes as the steps illustrated in FIG. 10 according to the first exemplary embodiment. The CPU 201 reads the program stored in the ROM 202 or the external storage device 204 and performs the steps to be described below.

In step S1001, the receiving unit 321 in the multifunction peripheral 103 receives the print data from the PC 101 or the printer 102.

In step S2001, the analysis unit 322 receives the print data from the receiving unit 321, and determines whether the received print data includes the Box storing request 1902. If the analysis unit 322 determines that the received print data includes the Box storing request 1902 (YES in step S2001), the process proceeds to step S2002. If the analysis unit 322 determines that the received print data does not include the Box storing request 1902 (NO in step S2001), the process proceeds to step S1007.

In step S2002, the job history recording unit 323 records the job history of the storing job which has stored the print data 1901 in the storage area.

In step S2003, the job history recording unit 323 stores the print data 1901 in the storage area of the external storage device 204. Further, the job history recording unit 323 stores in the storing area the job history recorded in step S2002. The job history recording unit 323 then transmits the recorded job history to the agent unit 324. The process then proceeds to step S1012. In step S1012, the agent unit 324 transmits to the data processing server 104 the recorded job history, and the print processing ends.

If the analysis unit 322 determines in step S2001 that the received print data does not include the Box storing request 1902, the process proceeds to step S1007. In step S1007, the analysis unit 322 determines whether the true-false value of the recorded flag 512 included in the print data is "true". If the true-false value of the recorded flag 512 is not "true", or the recorded flag 512 is not included in the print data (NO in step S1007), the process proceeds to step S2004. If the true-false value of the recorded flag 512 is "true" (YES in step S1007), the process proceeds to step S1013. In step S1013, the multifunction peripheral 103 performs printing, and the print processing ends.

In step S2004, the job history recording unit 323 records the job history of the job to be executed by the multifunction peripheral 103 based on the received print data.

In step S2005, the print execution unit 325 performs printing based on the received print data.

FIG. 21 illustrates an example of the job history which the multifunction peripheral 103 transmits to the data processing server 104 according to the fourth exemplary embodiment.

Referring to FIG. 21, a job type 2012 in a job history 2101 is the "Box storing job", which is different as compared to the job history 811 that the multifunction peripheral 103 transmits to the data processing server 104 according to the first exemplary embodiment. Further, a job starting time 2102 in the job history 2101 is different as compared to that in the job history 811 for the following reason. According to the fourth exemplary embodiment, since the multifunction peripheral 103 records the attribute information, the time at which the printer 102 transmits the print data to the multifunction peripheral 103 becomes the job starting time in the job history 2101.

As described above, according to the fourth exemplary embodiment, the multifunction peripheral 103 instead of the printer 102 records the attribute information. The load on the printer 102 in performing printing can thus be reduced as compared to the first exemplary embodiment.

OTHER EMBODIMENTS

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment (s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-173963 filed Aug. 6, 2012, which is hereby incorporated by reference herein in its entirety.

What is claimed is:

1. An image forming apparatus configured to execute print processing based on print data received from an information processing apparatus, the image forming apparatus comprising:
   a determination unit configured to determine whether the print data received from the information processing apparatus includes identification information indicating that a history of a job to be performed by the image forming apparatus is previously recorded as a job history and transmitted to a job history management server;
   a transmission unit configured to, in a case where the determination unit determines that the print data does not include the identification information, transmit the print data to other image forming apparatus so that the other image forming apparatus records as a job history a history of the job to be processed by the image forming apparatus and transmits the recorded job history to the job history management server;
   a receiving unit configured to receive from the other image forming apparatus information on whether the other image forming apparatus has succeeded in transmitting to the job history management server a history corresponding to the transmitted print data; and
   a print execution unit configured to, in a case where the information received by the receiving unit is information that transmission of the job history has succeeded, perform print processing based on the print data,
   wherein, in a case where the information received by the receiving unit is information that transmission of the job history has failed, the print processing based on the print data is canceled.

2. The image forming apparatus according to claim 1, further comprising an attribute information recording unit configured to record attribute information of a job to be performed by the image forming apparatus,
   wherein the transmission unit is configured to, in a case where the determination unit determines that the identification information is not included in the print data, transmit the print data and the attribute information to the other image forming apparatus so that the other image forming apparatus records, based on the received print data and the received attribute information, the history of the job other than the attribute information recorded by the attribute information recording unit.

3. The image forming apparatus according to claim 1, wherein the transmission unit is configured to transmit the print data to the other image forming apparatus using the transmission unit so that the other image forming apparatus is controlled to store the print data in a storage area in the other image forming apparatus for storing the print data.

4. A control method of an image forming apparatus configured to execute print processing based on print data received from an information processing apparatus, the method comprising:
   determining whether the print data received from the information processing apparatus includes identification information indicating that a history of a job to be performed by the image forming apparatus is previously recorded as a job history and transmitted to a job history management server;
   transmitting, in a case where it is determined that the print data does not include the identification information, the print data to other image forming apparatus so that the other image forming apparatus records as a job history a history of the job to be processed by the image forming apparatus and transmits the recoded job history to the job history management server; and
   receiving from the other image forming apparatus information on whether the other image forming apparatus has succeeded in transmitting to the job history management server a history corresponding to the transmitted print data; and
   in a case where the information received by the receiving unit is information that transmission of the job history has succeeded, performing print processing based on the print data,
   wherein, in a case where the information received by the receiving is information that transmission of the job history has failed, the print processing based on the print data is canceled.

5. A control method of an image forming apparatus configured to connect to a job history management server that manages as a job history a history of a job performed by an image forming apparatus which executes print processing, and execute print processing based on print data received from an information processing apparatus or other image forming apparatus, the method comprising:
   receiving the print data from the information processing apparatus or the other image forming apparatus;
   recording a history of a job to be performed by the other image forming apparatus as a job history and transmitting the job history to the job history management server, without executing printing processing based on the print data received from the other image forming apparatus in the receiving; and
   receiving from the other image forming apparatus information on whether the other image forming apparatus has succeeded in transmitting to the job history management server a history corresponding to the transmitted print data; and
   in a case where the information received by the receiving unit is information that transmission of the job history has succeeded, performing print processing based on the print data,
   wherein, in a case where the information received by the receiving is information that transmission of the job history has failed, the print processing based on the print data is canceled.

6. A non-transitory computer-readable storage medium storing a program for causing a computer to perform the image processing method according to claim 4.

7. A non-transitory computer-readable storage medium storing a program for causing a computer to perform the image processing method according to claim 5.

* * * * *